United States Patent [19]

Itoh

[11] Patent Number: 4,740,447

[45] Date of Patent: Apr. 26, 1988

[54] OPTICAL RECORDING MEDIUM

[75] Inventor: Masaki Itoh, Tokyo, Japan

[73] Assignee: NEC Corporation, Tokyo, Japan

[21] Appl. No.: 803,704

[22] Filed: Dec. 2, 1985

[30] Foreign Application Priority Data

Nov. 30, 1984 [JP] Japan ................................ 59-253517
Nov. 30, 1984 [JP] Japan ................................ 59-253518

[51] Int. Cl.$^4$ ........................ G01D 15/34; G03C 1/80
[52] U.S. Cl. ................................. 430/270; 430/271; 430/272; 430/945; 430/496; 346/135.1; 346/76 L; 369/94; 369/284; 369/288; 369/275
[58] Field of Search ............... 430/271, 272, 495, 945, 430/496, 270; 346/135.1, 76 L; 369/94, 275, 284, 288

[56] References Cited

U.S. PATENT DOCUMENTS

| | | | |
|---|---|---|---|
| 4,357,616 | 11/1982 | Terao et al. | 430/945 |
| 4,508,811 | 4/1985 | Gravesteijn et al. | 430/945 |
| 4,509,161 | 4/1985 | Van de Leest et al. | 430/945 |
| 4,614,951 | 9/1986 | Osato et al. | 430/945 |

FOREIGN PATENT DOCUMENTS 54-111801  9/1979  Japan ................................ 430/945

*Primary Examiner*—Won H. Louie
*Attorney, Agent, or Firm*—Sughrue, Mion, Zinn, Macpeak & Seas

[57] ABSTRACT

An optical recording medium such as an optical disc memory, with which data can be stored and reproduced by means of laser beam with a high sensitivity is disclosed.

The optical recording medium comprises:
- a substrate transparent to the laser beam;
- a first spacer layer formed on the substrate, being substantially transparent to the laser beam and having a higher refractive index than the substrate with respect to said laser beam;
- a second spacer layer formed on the first spacer layer, being substantially transparent to the laser beam and having a lower refractive index than the first layer with respect to said laser beam; and
- a recording layer formed on the second spacer layer and for storing data therein by the radiation of laser beam.

The thickness of the first spacer layer is not larger than a thickness at which the first spacer layer, when combined only with the substrate, presents a maximal reflectivity with respect to a laser beam being incident on the substrate and the thickness of the second spacer layer is smaller than a thickness at which the second spacer layer, when combined only with said first spacer layer and the substrate, presents a minimal reflectivity with respect to a laser beam being incident on the substrate.

22 Claims, 20 Drawing Sheets

OPTICAL RECORDING MEDIUM

FIELD OF THE INVENTION

The present invention relates to a novel optical recording medium with which data can be stored and reproduced by means of laser beam with a high sensibility.

DESCRIPTION OF THE RELATED ART

The optical disc memory of rewritable type with which data can be stored and reproduced has a high recording density and thus it is suitably used as a memory device of a large capacity. As the recording layer of the optical disc memory of rewritable type, thin film of a metalloid such as Te, Bi, etc., and of an organic material has been used. The organic thin film has excellent heating properties compared with those of the metalloid thin film. That is, the organic thin film presents a low heat conductivity and a low thermal capacity, so that the temperature raise per energy absorbing density is relatively high, and thus a high recording sensitivity may be obtained. With the transistor laser of which the wavelength range is lower than 800 nm, however, the organic thin film does not present a large reflectivity as compared with the metalloid thin film, so that, when the transistor laser is used as a light source for reproduction, it is difficult to obtain read signals and servo control signals of a high sensibility.

As a measure for improving the above problem, it has been known in the art to employ a recording medium in which a reflecting layer of Al, etc. is interposed between the substrate and the organic thin film. In the recording medium of such a construction, the thickness of the organic thin film is adjusted to control the change of the reflectivity due to the recording operation by the radiation of laser beam. That is, by controlling the thickness of the organic thin film, the change in the reflectivity may be increased to a substantially same degree to that of the recording medium of metalloid.

With the recording medium of such a construction, however, the incident side of the beam for recording and reading operation is restricted to the side of the surface of the recording layer.

SUMMARY OF THE INVENTION

Accordingly, the object of the present invention is to provide an optical recording medium with which read and servo control signals can be obtained with a high sensibility.

It is another object of the present invention to provide an optical recording medium which presents a large variation in reflectivity after the writing operation.

It is a further object of the present invention to provide an optical recording medium with which the writing and reading operation can be conducted by a laser beam incident on the side of the substrate.

According to the present invention, there is provided an optical recording medium, in which data is recorded and from which data is read by the radiation of laser beam, said optical recording medium comprising:

a substrate transparent to the laser beam;

a first spacer layer formed on the substrate, being substantially transparent to the laser beam and having a higher refractive index than the substrate with respect to said laser beam;

a second spacer layer formed on the first spacer layer, being substantially transparent to the laser beam and having a lower refractive index than the first layer with respect to said laser beam; and a recording layer formed on the second spacer layer and for storing data therein by the radiation of laser beam, said optical recording medium being characterized in that;

the thickness of the first spacer layer is not larger than a thickness at which the first spacer layer, when combined only with the substrate, presents a maximal reflectivity with respect to a laser beam being incident on the substrate; and that the thickness of the second spacer layer is smaller than a thickness at which the second spacer layer, when combined only with said first spacer layer and the substrate, presents a minimal reflectivity with respect to a laser beam being incident on the substrate.

According to a first embodiment of the present invention, the thickness of the first spacer layer is equal to a thickness at which the first spacer layer, when combined only with the substrate, presents a maximal reflectivity with respect to a laser beam being incident on the substrate.

According to a second embodiment of the present invention, the thickness of the first spacer layer is smaller than a thickness at which the first spacer layer, when combined only with the substrate, presents a maximal reflectivity with respect to a laser beam being incident on the substrate.

According to a preferred embodiment of the present invention, the thickness of the recording layer is adjusted so that the recording medium presents a minimal reflectivity, when the thickness of the recording layer becomes about 15 to 25% of the initial thickness due to the radiation of the laser beam.

According to the present invention, there is further provided an optical disc memory, in which data is recorded and from which data is read by the radiation of laser beam, said optical recording medium comprising:

a substrate being in the form of disc and transparent to the laser beam and provided with guide grooves for guiding the axis of the laser beam;

a first spacer layer formed on the substrate, being substantially transparent to the laser beam and having a higher refractive index than the substrate with respect to said laser beam;

a second spacer layer formed on the first spacer layer, being substantially transparent to the laser beam and having a lower refractive index than the first layer with respect to said laser beam; and a recording layer formed on the second spacer layer and for storing data therein by the radiation of laser beam;

the thickness of the first spacer layer being not larger than a thickness at which the first spacer layer, when combined only with the substrate, presents a maximal reflectivity with respect to a laser beam being incident on the substrate; and the thickness of the second spacer layer being smaller than a thickness at which the second spacer layer, when combined only with said first spacer layer and the substrate, presents a minimal reflectivity with respect to a laser beam being incident on the substrate.

The above and other objects, features and advantages of the present invention will be apparent from the following description of the preferred embodiments of the

BRIEF DESCRIPTION OF THE ATTACHED DRAWINGS

DESCRIPTION OF THE PREFERRED EMBODIMENTS

Generally, the reflectivity of a medium composed of a transparent substrate and a recording layer formed thereon depends upon the optical constant or complex index of refraction of the substrate and the recording layer and upon the thickness of the recording layer. The transparent substrate is usually composed of various synthetic resins or a glass. The refractive index of these materials does not substantially vary with wavelength of the beam and it is rather constant at about 1.5 with respect to a beam of which the wavelength ranges from that of the visible light to that of the near infrared radiation. Accordingly, it may be concluded that the reflectivity of such a recording medium is determined by the optical constant and the thickness of the recording layer.

In case the recording layer is composed of an organic coloring material or a coloring material dispersed in a resin, the complex index of refraction $(n-ik)$ of the recording layer is at most $2.6-i0.8$ with respect to the laser beam having a wavelength of the transistor laser (that is, a wavelength up to 800 nm).

As mentioned above, the reflectivity of a recording medium composed of a transparent substrate having a constant index of refraction and a recording layer having a constant complex index of refraction is determined mainly by the thickness of the recording layer.

Figure 1:
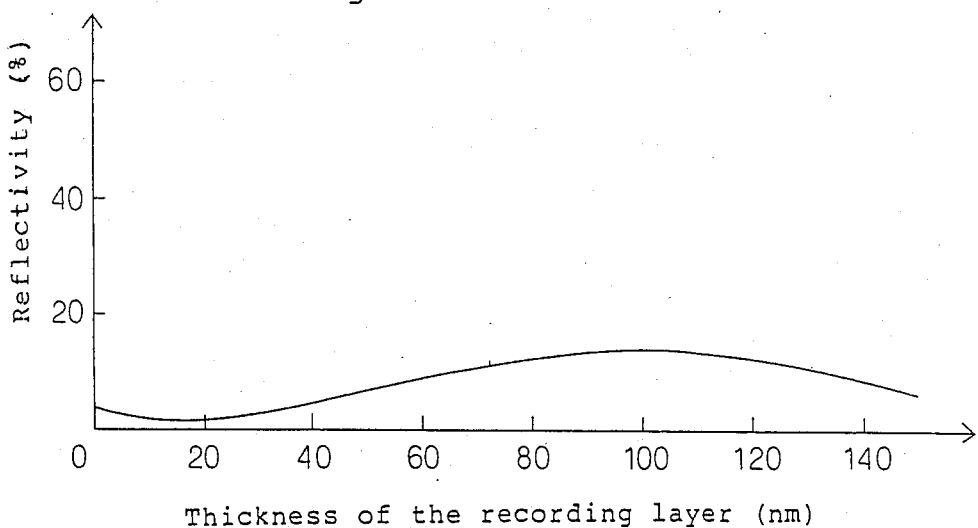
FIG. 1 shows the relationship of the reflectivity and the thickness of the recording layer of a recording medium of the prior art.

FIG. 1 shows the variation of the reflectivity of a recording medium composed of a substrate having an index of refraction of 1.5 and a recording layer having a complex index of refraction of $2.1-i0.6$, with respect to a laser beam having a wavelength 830 nm and being incident on the surface of the substrate. As shown in FIG. 1, the reflectivity varies with the thickness of the recording layer. The reflectivity is maximal at a thickness of about 100 nm of the recording layer. The maximal value of the reflectivity, however, is as low as about 15%, which means that the read signal and the servo control signal cannot be obtained with a high sensibility.

Such a problem that a high reflectivity cannot be attained is resolved by the present invention.

Figure 2:
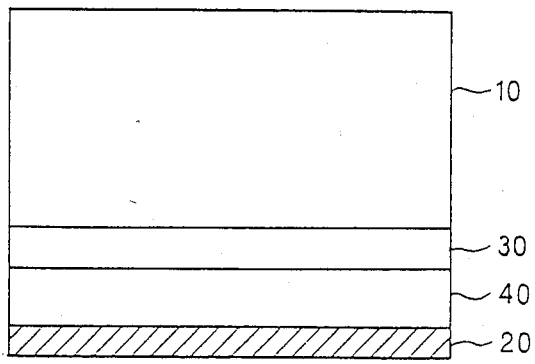
FIG. 2 illustrates diagramatically the construction of a recording medium according to the present invention.

FIG. 2 shows the construction of a recording medium according to the present invention.

As shown in FIG. 2, the recording medium according to the present invention comprises a substrate 10, a first spacer layer 30, a second spacer layer 40 and a recording layer 20. The materials and the thickness of the first and second spacer layers 30 and 40 are selected to satisfy the following conditions in order to increase the reflectivity of the recording medium.

Figure 3:
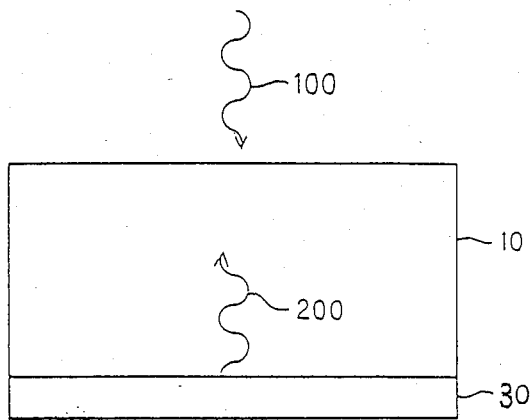
FIGS. 3 and 4 illustrate respectively the principle of the present invention.

First, supposing a stack of layers composed only of a substrate 10 and a first spacer layer 30 as shown in FIG. 3.

A beam 100 incident upon and through the substrate 10 is reflected at the interface between the substrate 10 and the first spacer layer 30 and at the interface between the first spacer layer 30 and the ambient air to constitute a reflecting beam 200. The intensity of the reflecting beam 200, that is, the reflectivity of the stacked layers shown in FIG. 3 is dependent on the index of refraction and the thickness of the first spacer layer 30. The material and the thickness of the first spacer layer 30 used according to the present invention should be selected to increase or maximize the intensity of the reflecting beam 200. Accordingly, the index of refraction of the first spacer layer 30 should be higher than that of the substrate 10. Further, the thickness of the first spacer layer 30 should be equal to or smaller than a thickness at which the intensity of the reflecting beam 200 is maximal.

Figure 4:
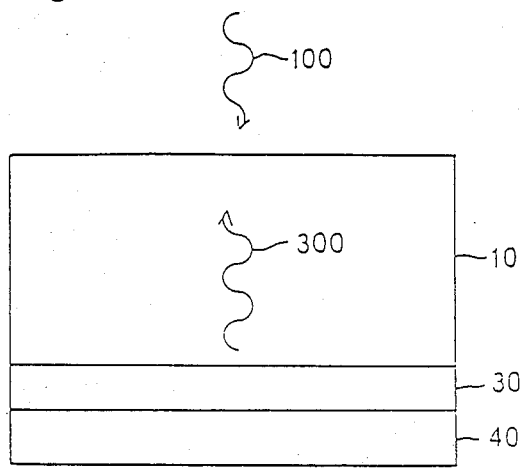

Second, suppose another type of a stacked layers composed of a substrate 10, a first spacer layer 30 and a second spacer layer 40 as shown in FIG. 4.

A beam 100 incident on and through the substrate 10 is reflected at the interface between the substrate 10 and the first spacer layer 30, at the interface between the first spacer layer 30 and the second spacer layer 40 and further at the interface between the second spacer layer 40 and the ambient air, to thereby constitute a reflecting beam 300. The intensity of the reflecting beam 300, that is, the reflectivity of the stacked layers shown in FIG. 4 is dependent upon the index of refraction and the thickness of the second spacer layer 40. Thus, the material and the thickness of the second spacer layer 40 used as the second spacer layer 40 of the recording medium according to the present invention should be selected to decrease or minimize the intensity of the reflecting beam 300 shown in FIG. 4.

Accordingly, the index of refraction of the second spacer layer 40 should be lower than that of the first spacer layer 30. Further, it is preferable that the thickness of the second spacer layer 40 is smaller than the thickness at which the reflecting beam 300 shown in FIG. 4 is minimal.

When a recording medium is prepared with the first and second spacer layers respectively satisfying the above-mentioned conditions and with a recording layer thereon, a high reflectivity and read signal of a high intensity can be obtained.

Recording media have been prepared in order to examine the relationship between the reflectivity and the thickness of the recording layer, while varying the thickness of the recording layer.

As a reference sample (sample No. 1), a recording medium composed of a substrate 10, a first spacer layer 30, a second spacer layer 40 and a recording layer 20 was prepared. In sample No. 1, the thickness of the first spacer layer 30 is equal to the thickness of the first spacer layer 30 of the stacked layers shown in FIG. 3, when the maximal reflectivity is obtained. The thickness of the second spacer layer 40 is also equal to the thickness of the second spacer layer 40 of the stacked layers shown in FIG. 4, when the minimal reflectivity is obtained. The index of refraction of the substrate 10 is 1.5 and the complex index of the recording layer 20 is $2.1-i0.6$. The index of refraction and the thickness of the first and second layers 30 and 40 are indicated in Table 1. A laser beam having a wavelength of 830 nm was used.

Figure 5:
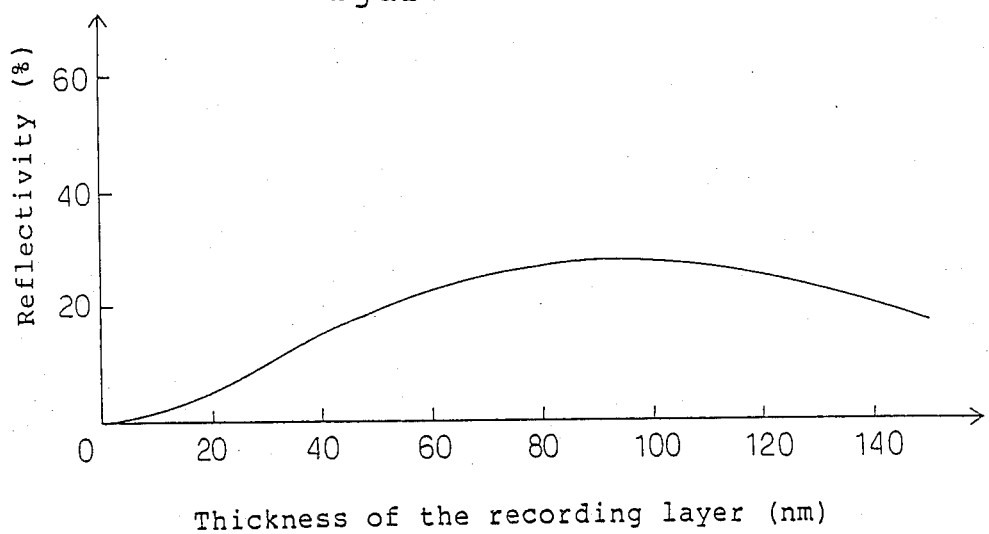
FIG. 5 shows the relationship of the reflectivity and the thickness of the recording layer of a recording medium of a reference sample.

By varying the thickness of the recording layer 20, the variation of the reflectivity of the recording medium of sample No. 1 was determined and the result is shown in FIG. 5.

As compared with the recording medium of which the reflectivity is shown in FIG. 1, it will be understood that the reflectivity of the recording medium of sample No. 1 is prominently improved as shown in FIG. 5 by the interposition of the first and second layers 30 and 40 between the substrate 10 and the recording layer 20.

Next, samples of the recording medium were prepared according to the first embodiment of the present invention. Each sample of the recording medium according to the present invention has been prepared as follows:

First, a first spacer layer 30 was formed on a substrate 10 in a thickness at which the reflectivity of a beam incident on the substrate 10 shown in FIG. 3 is maximal. The substrate 10 of each sample had an index of refraction of 1.5.

Second, a second spacer layer 40 was formed on the first spacer layer 30 and then a recording layer 20 having a complex index of refraction of $2.1-i0.6$ was formed the second spacer layer 40.

The index of refraction and the thickness of the first and second spacer layers 30 and 40 of each sample are shown in Table 1. In Table 1, $T_{min}$ indicates the thickness of the second spacer layer 40, at which the reflectivity of the stacked layers of the substrate 10, the first and second spacer layers 30 and 40, as shown in FIG. 4, is minimal with respect to a beam being incident on the substrate surface and having a wavelength of 830 nm. In the recording media of sample Nos. 2 to 17, which have been prepared according to the first embodiment of the present invention, the thickness of the second spacer layer 40 is smaller than $T_{min}$.

The relationship between the thickness of the recording layer 20 and the reflectivity of the resulting recording medium in each sample was determined by varying the thickness of the recording layer 20 is shown respectively in the attasched drawings indicated in Table 1.

TABLE 1

Figure 6:
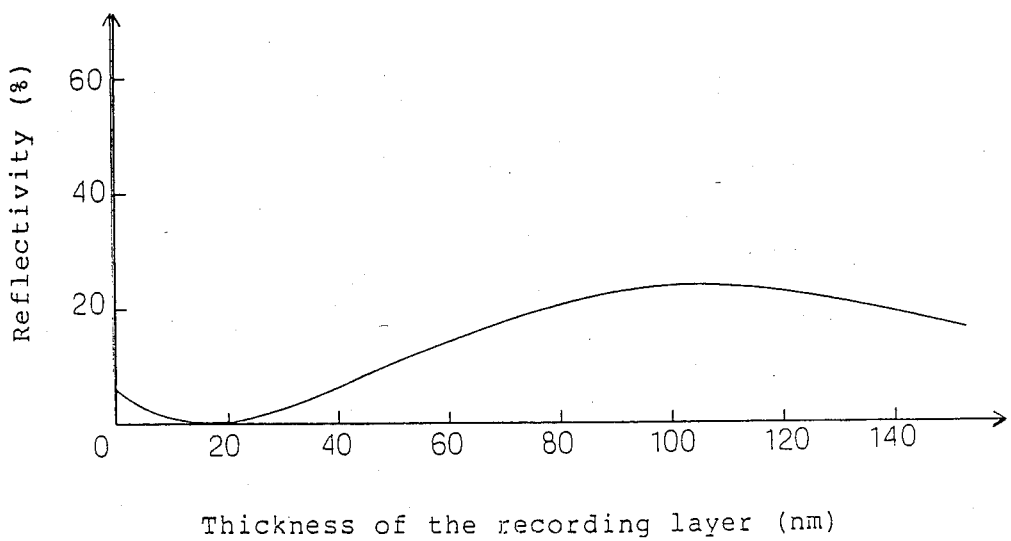
FIGS. 6 to 21 show respectively the relationship of the reflectivity and the thickness of the recording layer of the recording media according to the first embodiment of the present invention.
Figure 7:
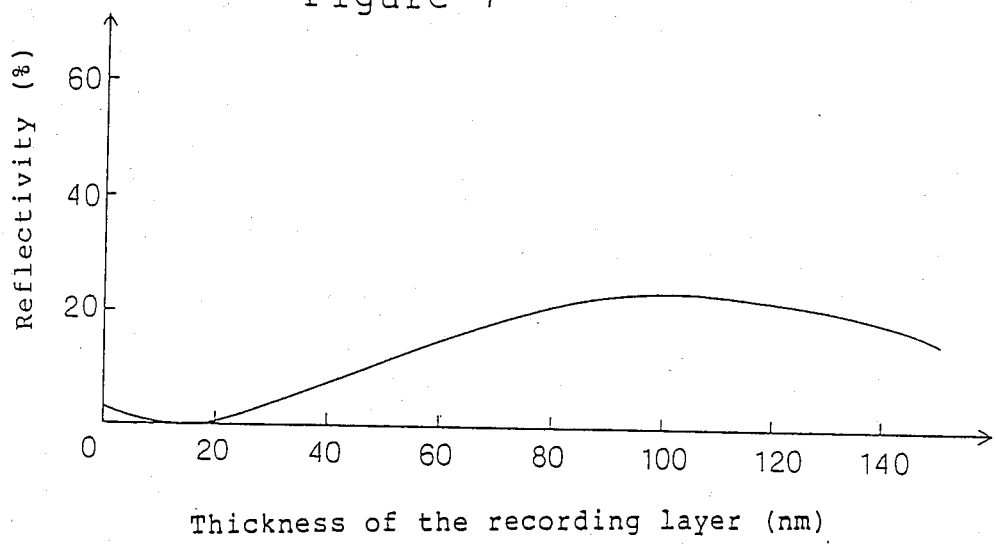
Figure 8:
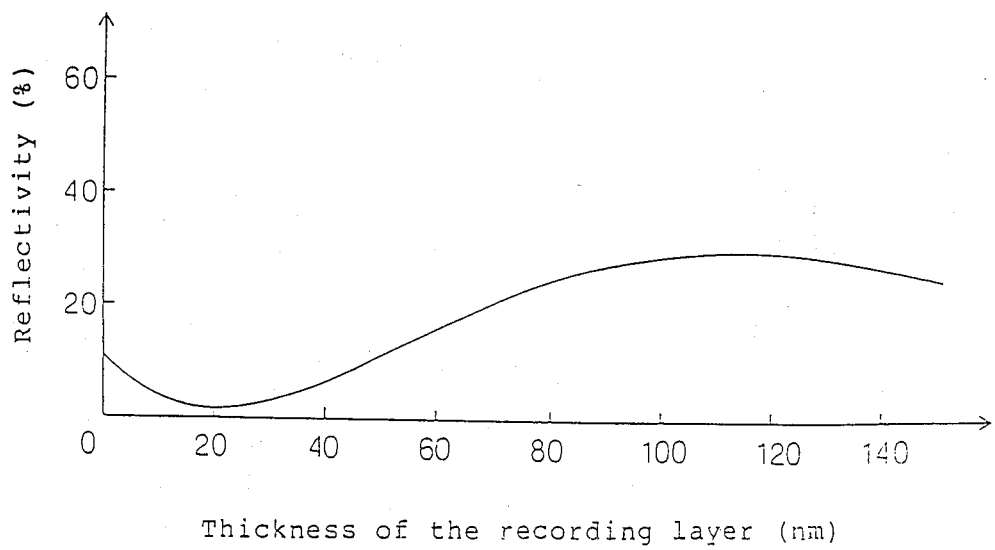
Figure 9:
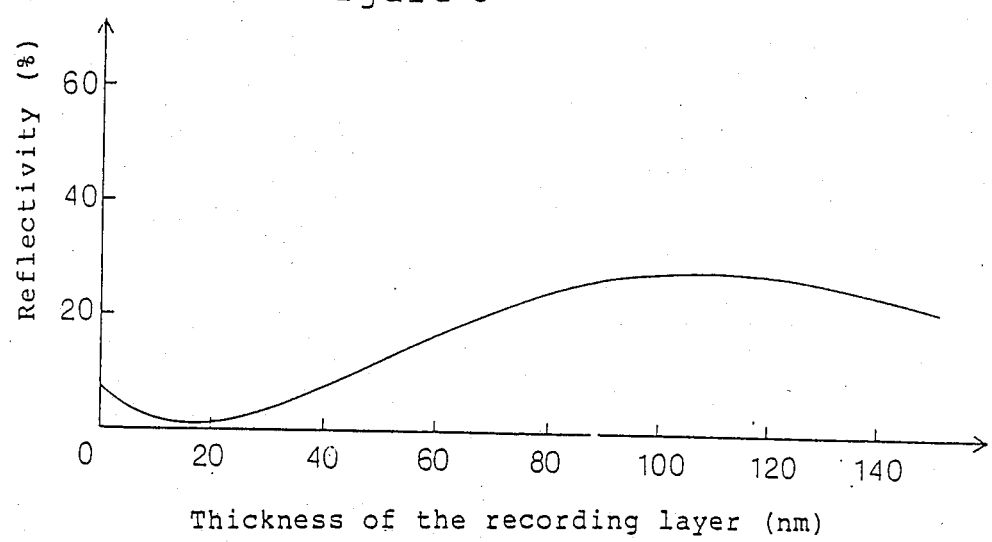
Figure 10:
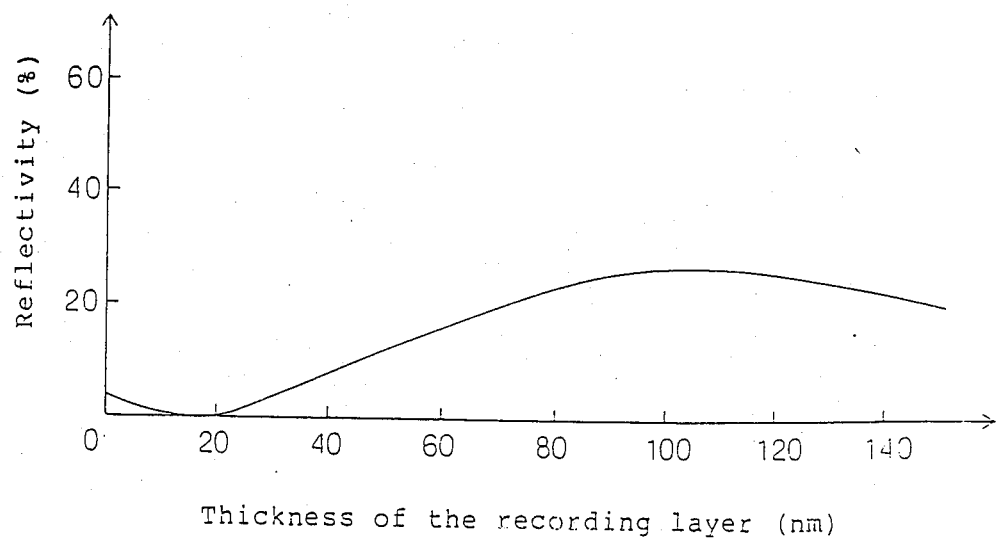
Figure 11:
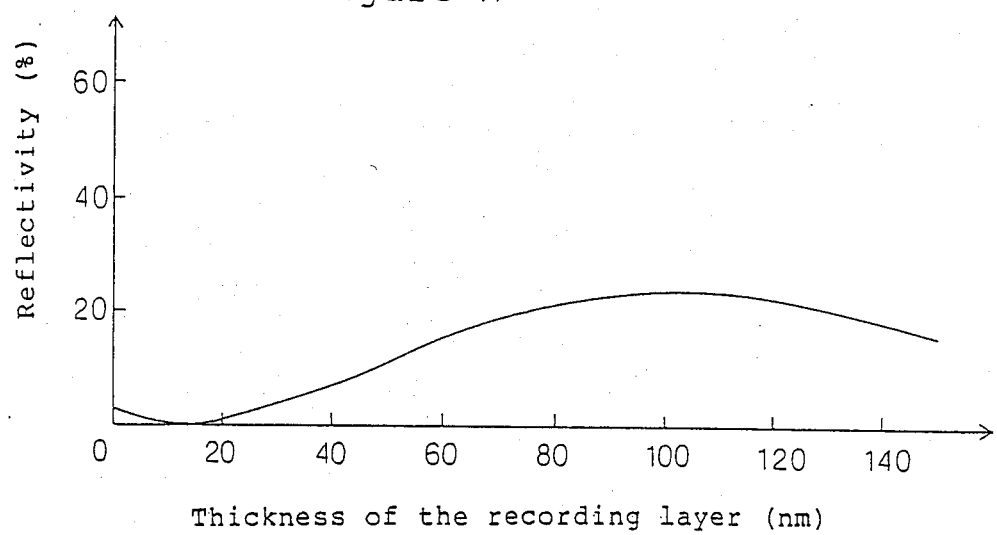
Figure 12:
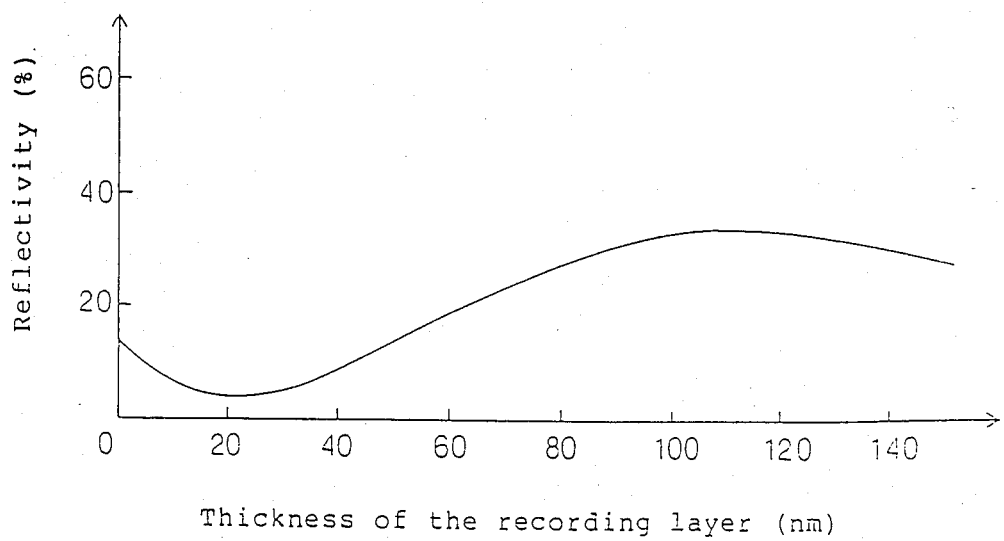
Figure 13:
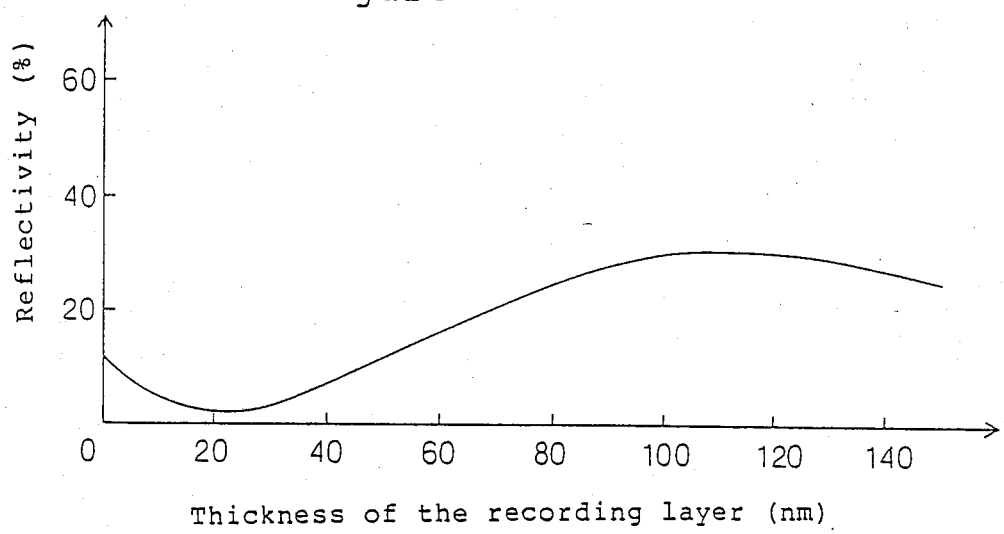
Figure 14:
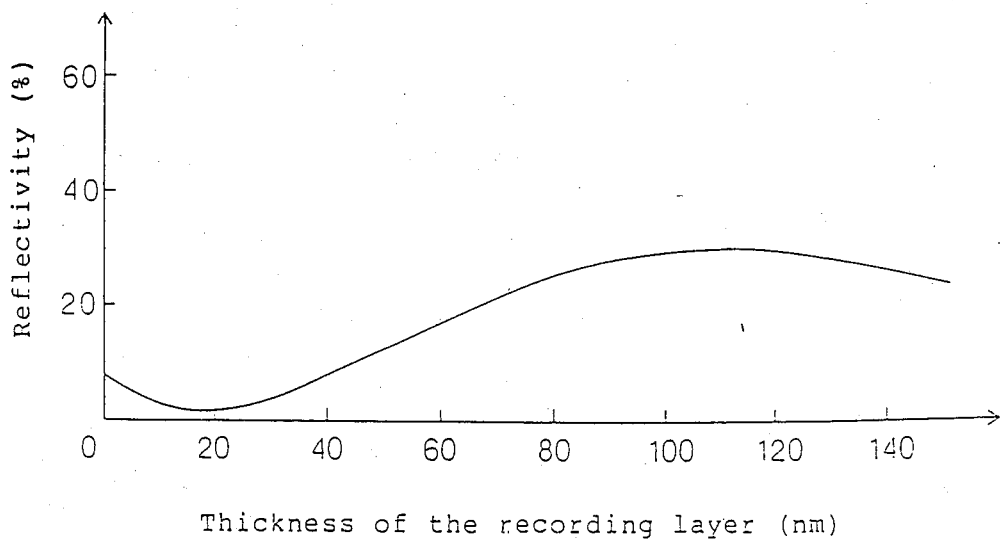
Figure 15:
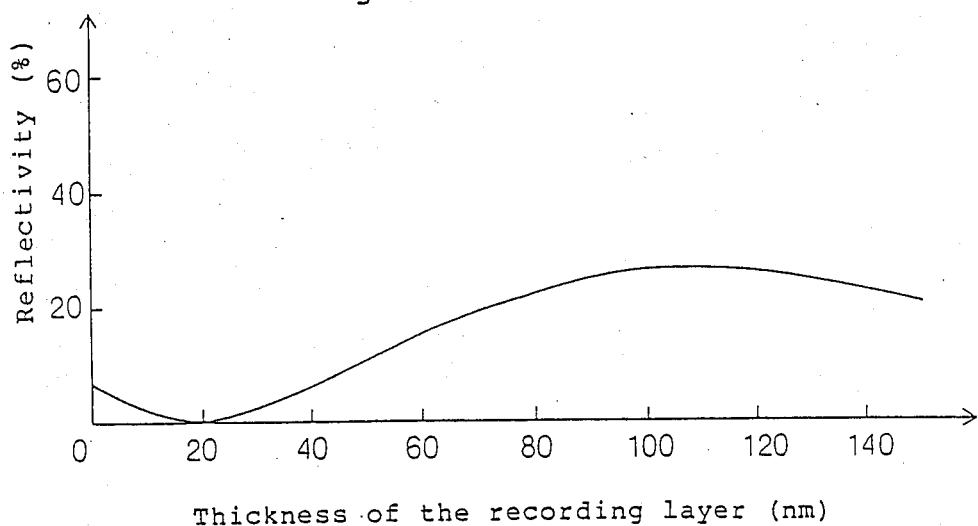
Figure 16:
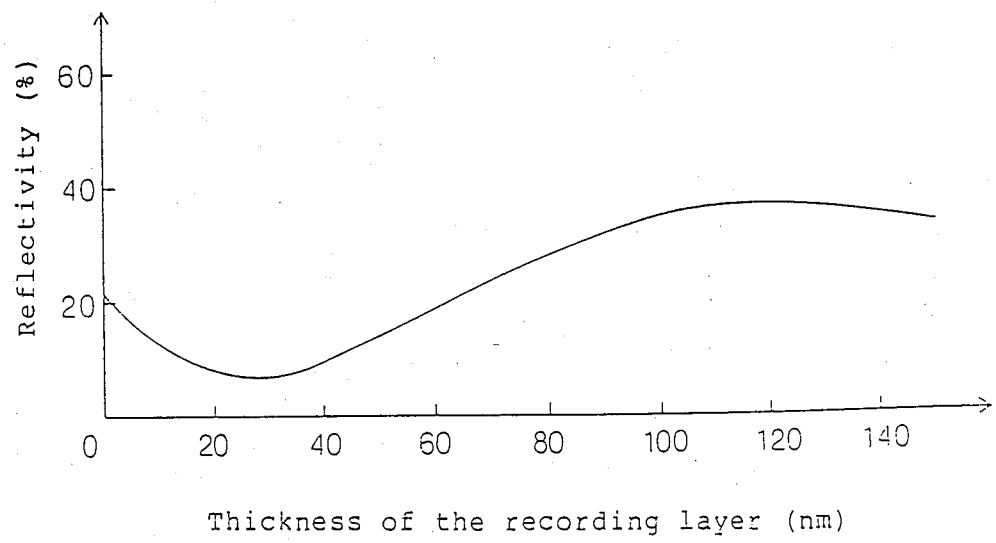
Figure 17:
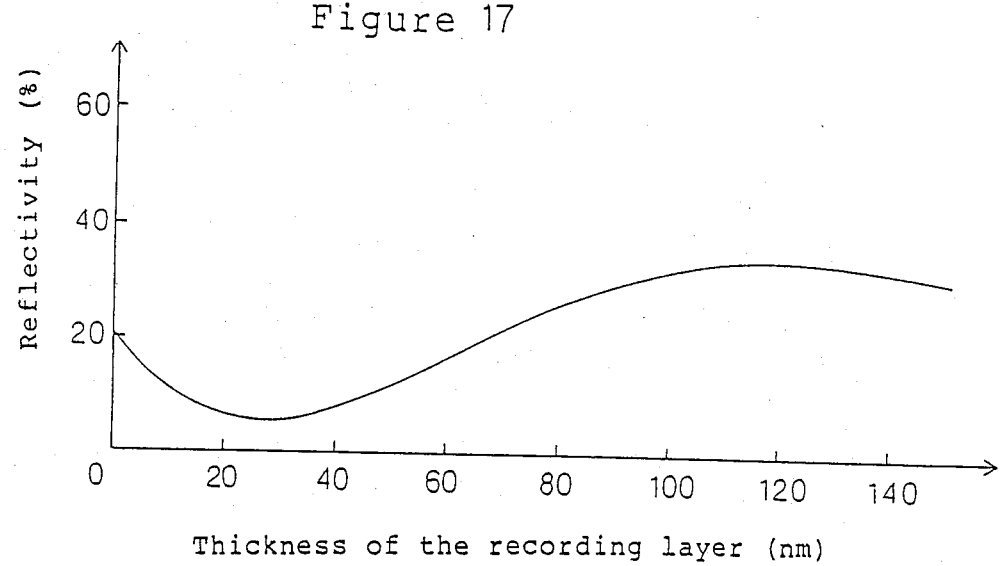
Figure 18:
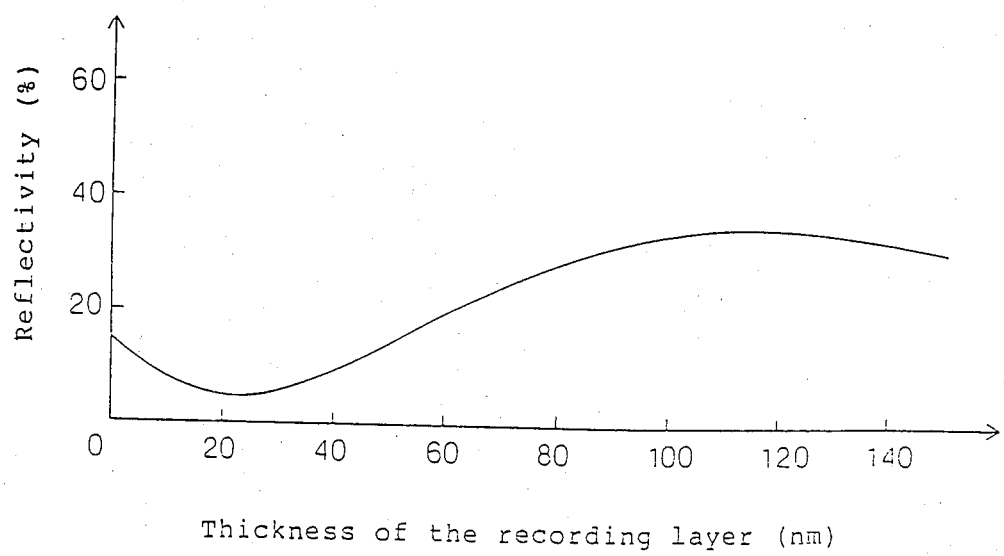
Figure 19:
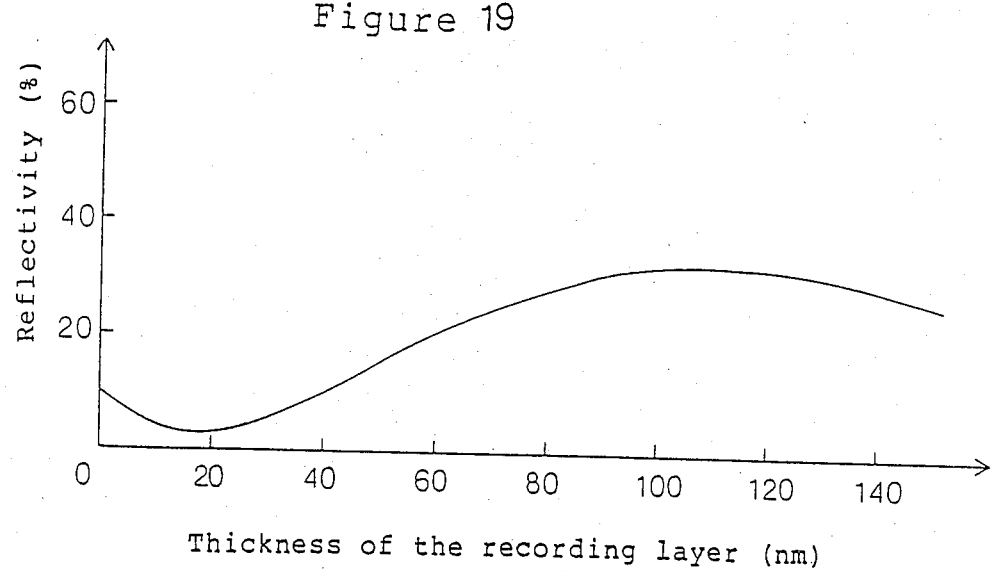
Figure 20:
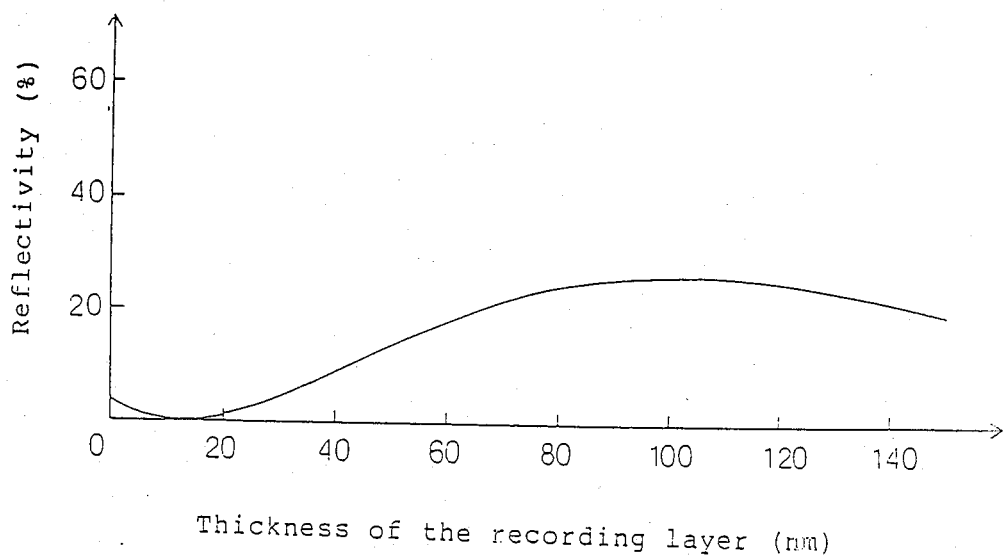
Figure 21:
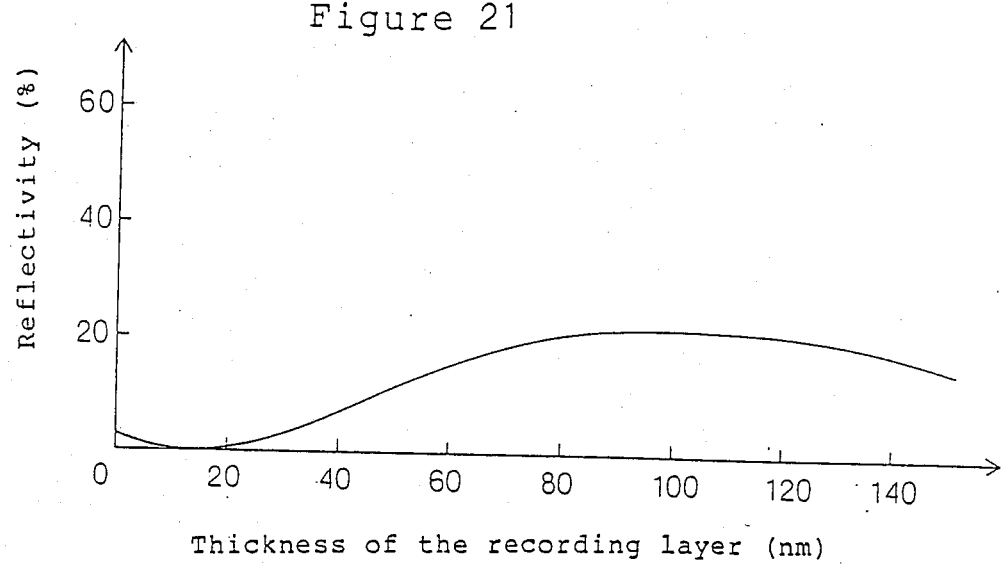

| Sample No. | First spacer layer | | Second spacer layer | | | |
|---|---|---|---|---|---|---|
| | Index of Refraction | Thickness (nm) | Index of Refraction | Thickness (nm) | $t_{min}$ (nm) | Drawing |
| 1 | 1.7 | 120 | 1.4 | $150 = T_{min}$ | 0 | FIG. 5 |
| 2 | 1.7 | 120 | 1.4 | $80 < T_{min}$ | 16 | FIG. 6 |
| 3 | 1.7 | 120 | 1.5 | $100 < T_{min}$ | 13 | FIG. 7 |
| 4 | 1.9 | 110 | 1.4 | $70 < T_{min}$ | 22 | FIG. 8 |
| 5 | 1.9 | 110 | 1.5 | $80 < T_{min}$ | 16 | FIG. 9 |
| 6 | 1.9 | 110 | 1.6 | $90 < T_{min}$ | 15 | FIG. 10 |
| 7 | 1.9 | 110 | 1.7 | $100 < T_{min}$ | 11 | FIG. 11 |
| 8 | 2.0 | 105 | 1.4 | $70 < T_{min}$ | 22 | FIG. 12 |
| 9 | 2.0 | 105 | 1.5 | $70 < T_{min}$ | 21 | FIG. 13 |
| 10 | 2.0 | 105 | 1.6 | $80 < T_{min}$ | 17 | FIG. 14 |
| 11 | 2.0 | 105 | 1.7 | $80 < T_{min}$ | 18 | FIG. 15 |
| 12 | 2.2 | 95 | 1.4 | $60 < T_{min}$ | 28 | FIG. 16 |
| 13 | 2.2 | 95 | 1.5 | $60 < T_{min}$ | 27 | FIG. 17 |
| 14 | 2.2 | 95 | 1.6 | $70 < T_{min}$ | 21 | FIG. 18 |
| 15 | 2.2 | 95 | 1.7 | $80 < T_{min}$ | 17 | FIG. 19 |
| 16 | 2.2 | 95 | 1.9 | $90 < T_{min}$ | 12 | FIG. 20 |
| 17 | 2.2 | 95 | 2.0 | $90 < T_{min}$ | 13 | FIG. 21 |

As mentioned above, in each of samples Nos. 2 to 17, the second spacer layer 40 was formed with a thickness smaller than $T_{min}$. For example, in the case of sample No. 2, the reflectivity of the stacked layers as shown in FIG. 4 is minimal, when the thickness of the second spacer layer 40 is 140 nm, while the second spacer layer was formed in a thickness of 80 nm.

As shown in FIGS. 6 to 21 which show respectively the reflectivity of the recording media of sample Nos. 2 to 17, by making the thickness of the second spacer layer 40 smaller than $T_{min}$, the thickness of the recording layer at which the reflectivity of the recording medium is minimal is shifted from 0 nm (sample No. 1) to a certain value. In Table 1, the thickness $t_{min}$ of the recording layer 20 at which the reflectivity of the recording medium is minimal for each sample is also indicated in Table 1.

In case the recording layer 20 is made of a thin film of an organic material, the writing operation of data by the radiation of laser beam does not form a through hole but a pit to leave about 20 to 30% in thickness of the recording layer. Then, the recording layer 20 is preferably formed with a thickness of about 80 nm to provide a read signal of higher sensibility in the recording media of sample Nos. 2 to 17. Because, the thickness of the recording layer becomes about 15 to 25 nm after the writing operation, at which the reflectivity is minimal. Thus, a big difference of the read signals between the recorded portion and the non-recorded portion can be obtained.

Next, the second embodiment of the present invention will be explained, in which the thickness of the first spacer layer 30 is smaller than $T_{max}$ at which the reflectivity of the stacked layers of the substrate 10 and the first spacer layer 30, as shown in FIG. 3, is maximal.

First, sample No. 18 of the recording medium was prepared as a reference sample by forming a first spacer layer 30 on a substrate 10 with a thickness $T_{max}$ of 105 nm at which the reflectivity of the stacked layers of the substrate 10 and the first spacer layer 30, as shown in FIG. 3, is maximal with respect to a beam having a wavelength of 830 nm and being incident on the substrate 10. The substrate 10 and the first spacer layer 30 have respectively an index of refraction of 1.5 and 2.0. Then, the second spacer layer 40 of an index of refraction of 1.5 was formed on the first spacer layer 30 with a thickness $T_{min}$ of 130 nm at which the reflectivity of the stacked layers of the substrate 10 and the first and second spacer layer 30 and 40, as shown in FIG. 4, is minimal with respect a beam having a wavelength of 830 nm and being incident on the substrate 10. Further, the recording layer having a complex index of refraction of 2.1−i0.6 was formed on the second spacer 40 to provide a recording medium.

Figure 22:
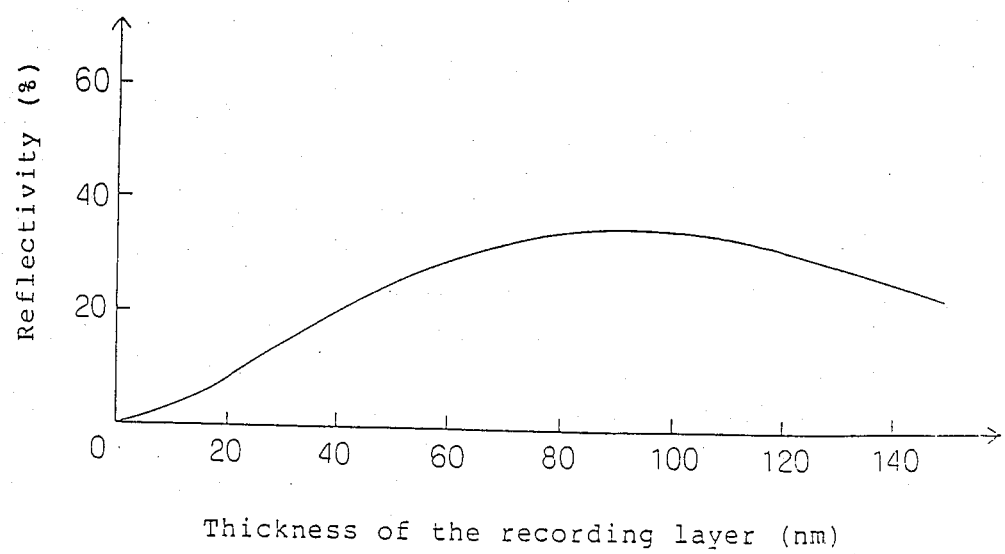
FIG. 22 shows the relationship of the reflectivity and the thickness of the recording layer of a recording medium of another reference sample.

The relationship between the thickness of the recording layer 20 and the reflectivity of the obtained recording medium was determined, while varying the thickness of the recording layer 20. The result is shown in FIG. 22.

Further, samples of the recording medium were prepared according to the second embodiment of the present invention with the same substrate as sample No. 18 and the first and second spacer layers 30 and 40 of which the index of refraction and the thickness are shown in Table 2. In Table 2, $T_{max}$ indicates the thickness of the first spacer layer 30 at which the reflectivity of the stacked layers of the substrate 10 and the first spacer layers 30, as shown in FIG. 3, presents a maximal value, while $T_{min}$ indicates the thickness of the second layer 40 at which the reflectivity of the stacked layers of the substrate 10 and the first and second spacer layers 30 and 40, as shown in FIG. 4, presents a minimal value.

Each of the relationship between the thickness of the recording layer 20 and the reflectivity of the resulting recording media is shown in the attached drawing indicated in Table 2.

As shown in FIGS. 22 to 38, these samples Nos. 18 to 34 present a prominently improved reflectivity as compared with the recording medium of which the reflectivity is shown in FIG. 1.

Further, in samples Nos. 19 to 34 of which the variations of the reflectivity are shown respectively in FIGS. 23 to 38, the thickness $t_{min}$ of the recording layer at which the recording medium presents a minimal reflectivity is shifted from 0 nm to a certain value, as compared with sample No. 18 of which $t_{min}$ is zero. In Table 2 also, the thickness $t_{min}$ of each sample is indicated.

TABLE 2

Figure 23:
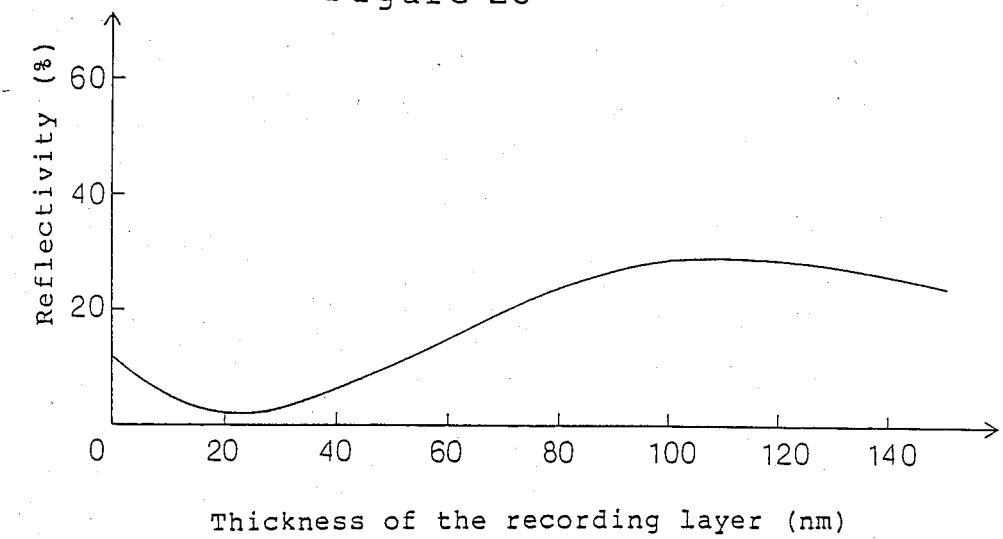
FIGS. 23 to 38 show respectively the relationship of the reflectivity and the thickness of the recording layer of the recording media according to the second embodiment of the present invention.
Figure 24:
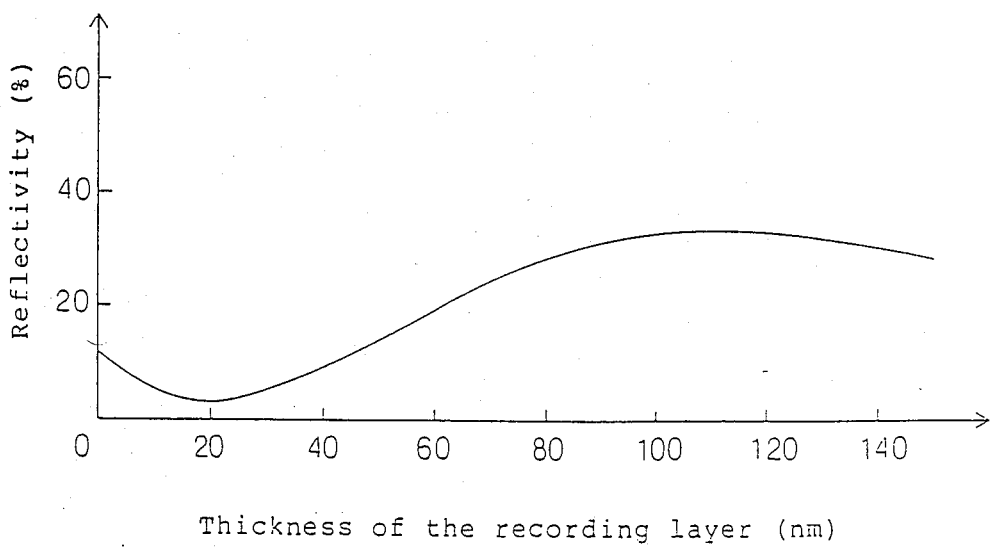
Figure 25:
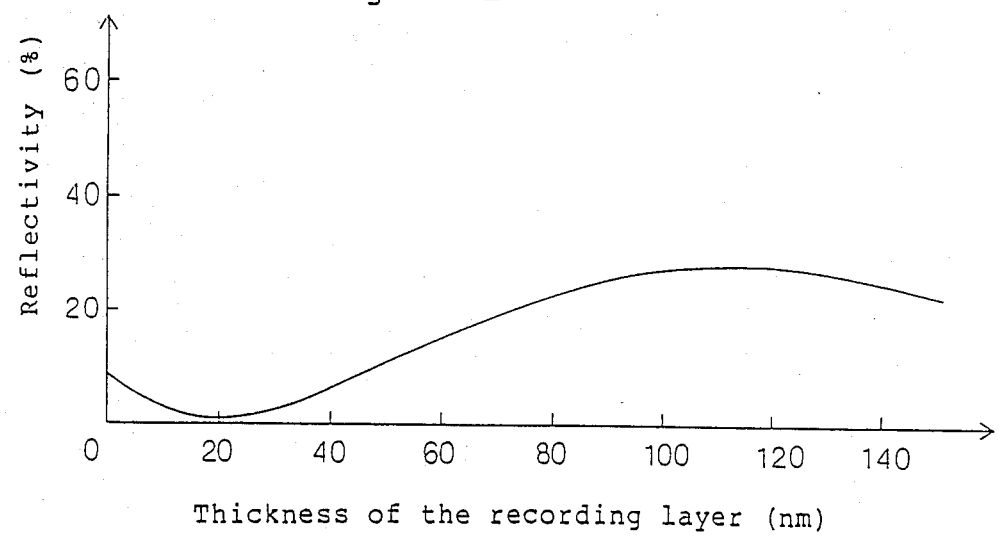
Figure 26:
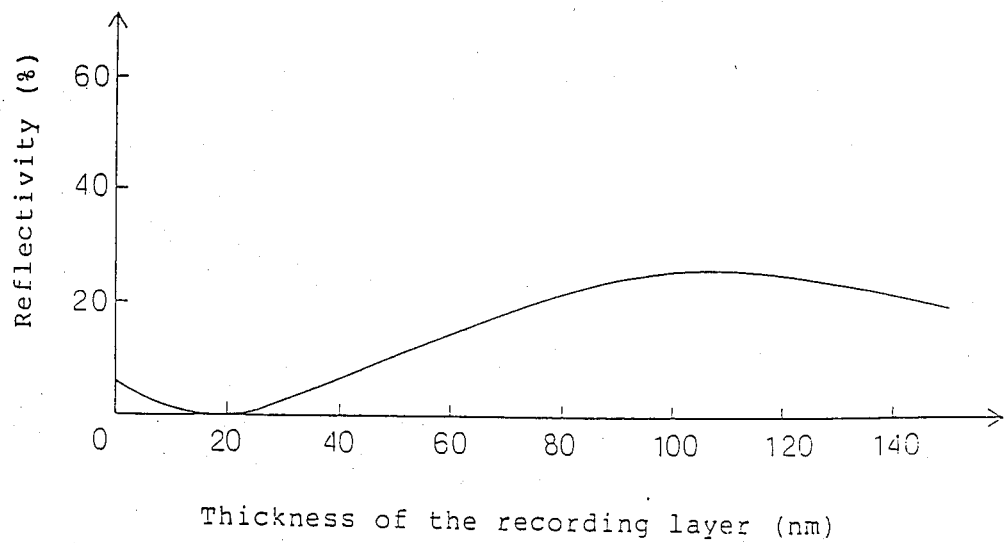
Figure 27:
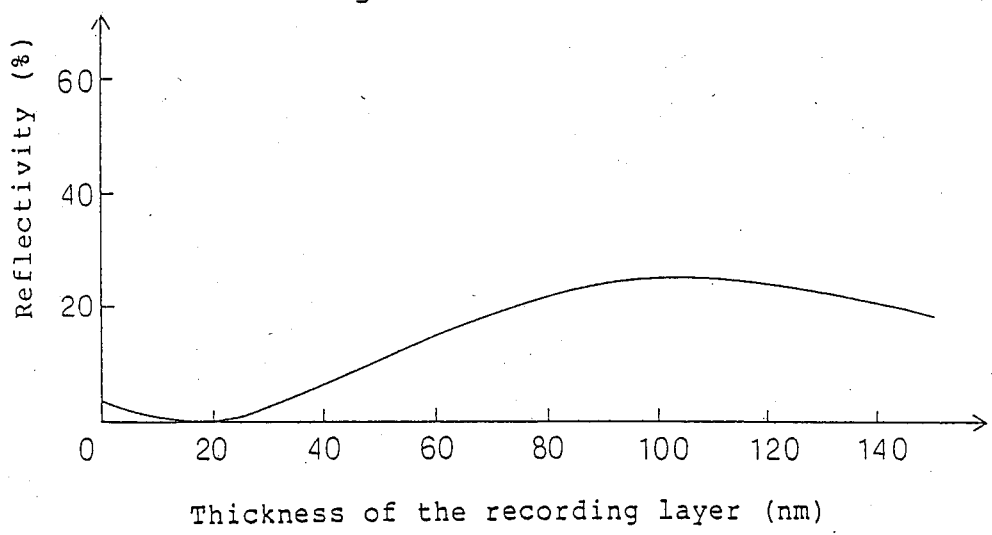
Figure 28:
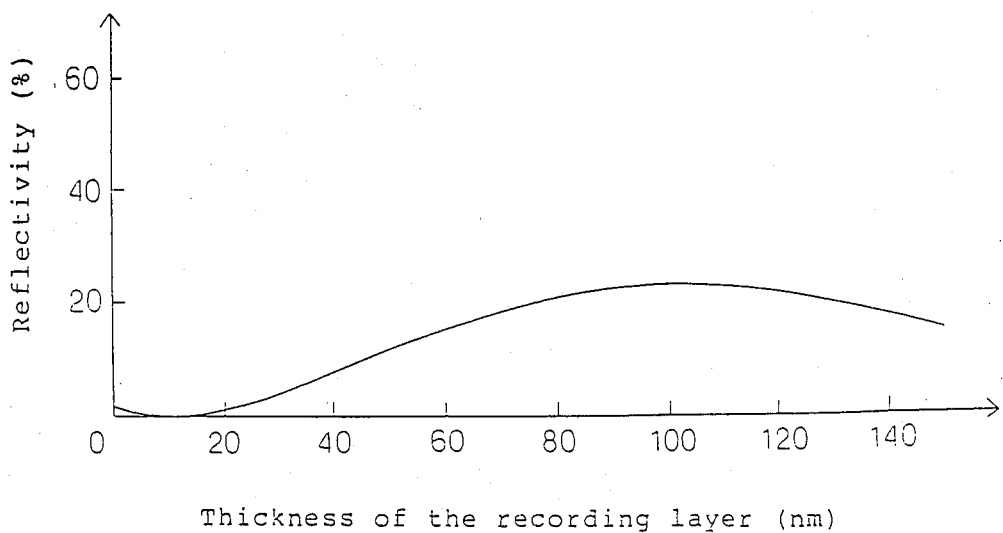
Figure 29:
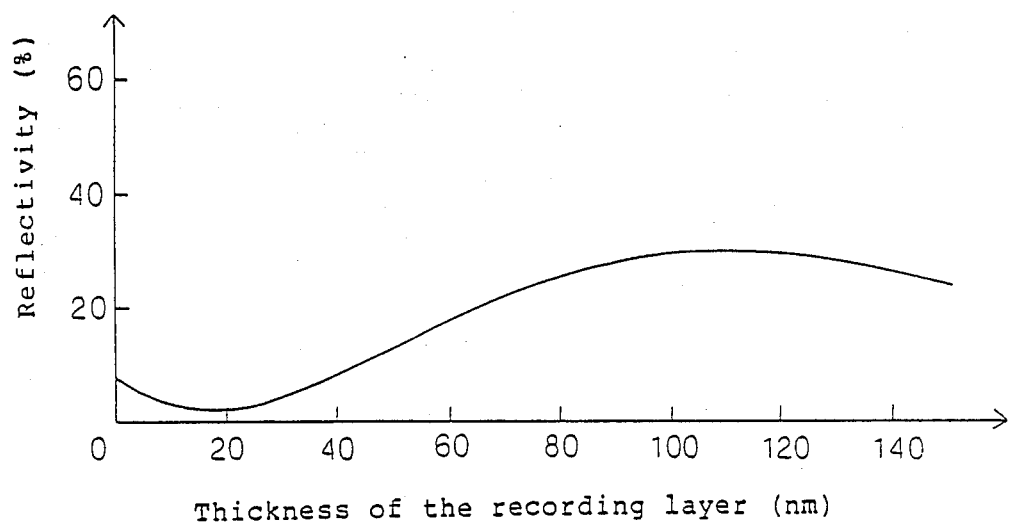
Figure 30:
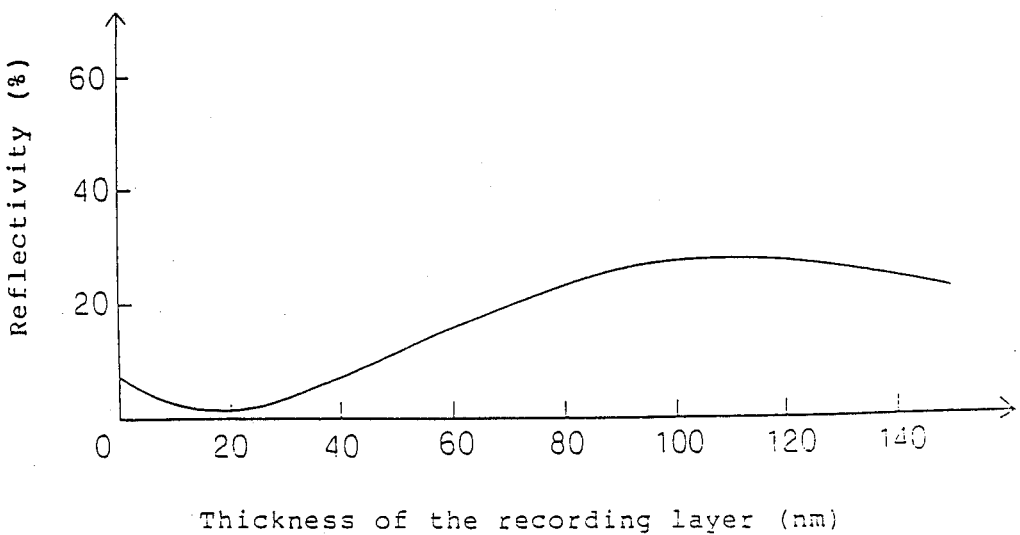
Figure 31:
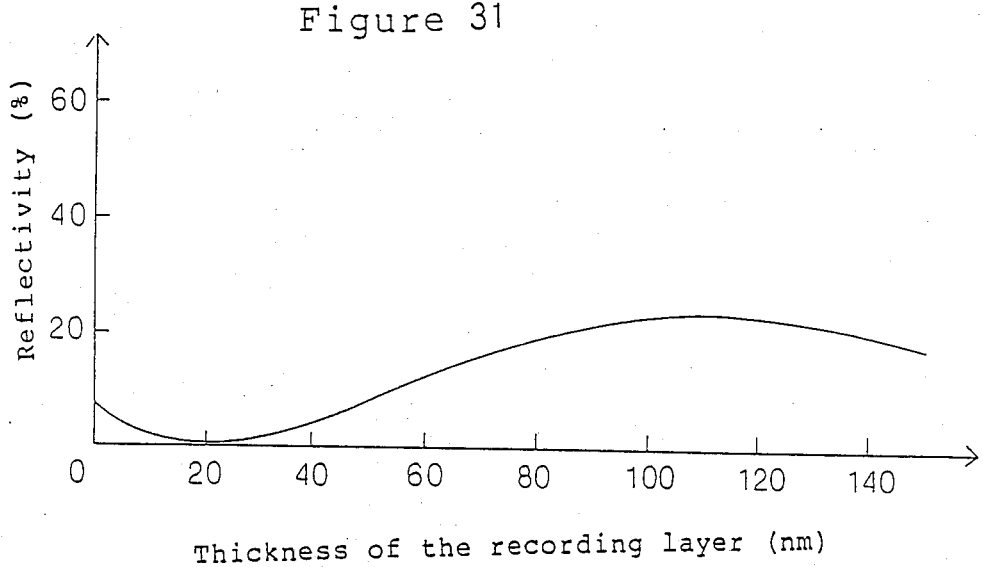
Figure 32:
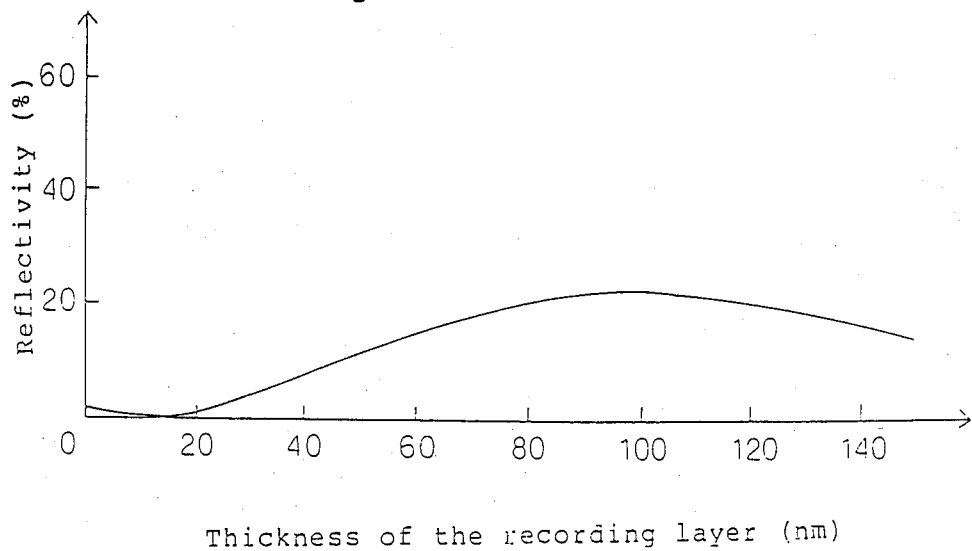
Figure 33:
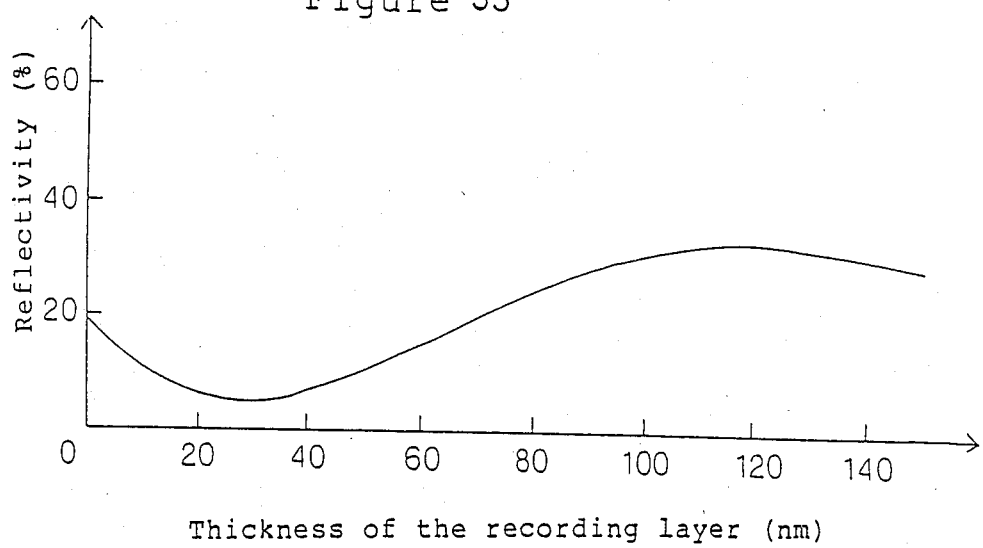
Figure 34:
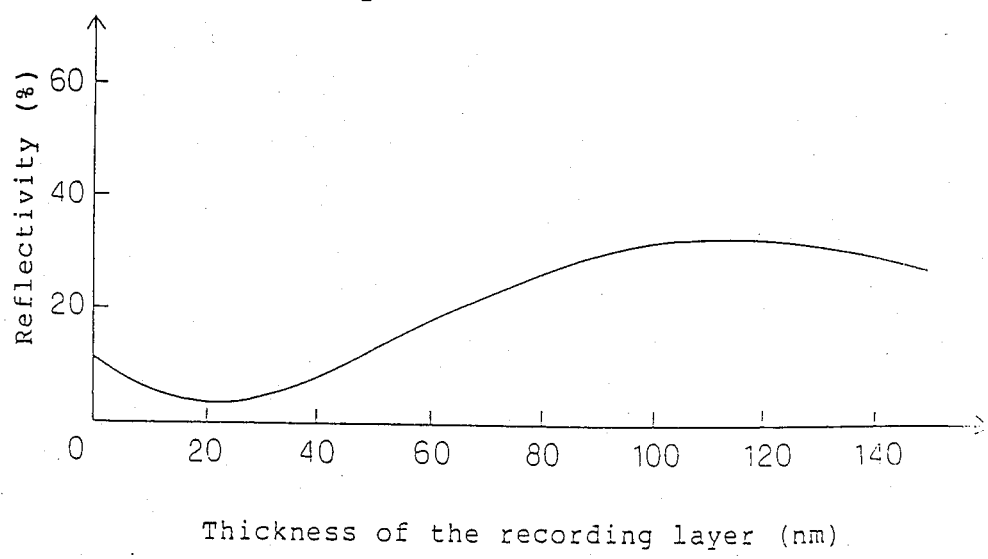
Figure 35:
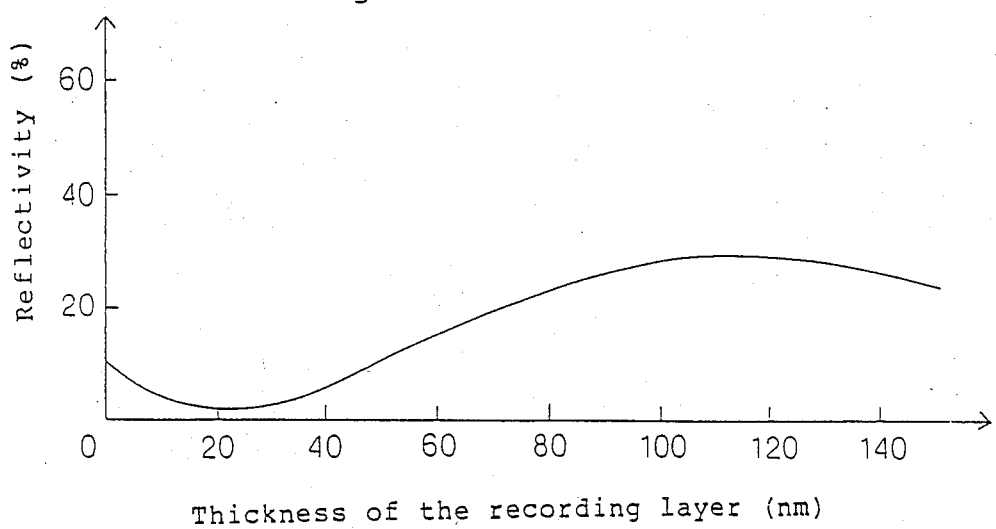
Figure 36:
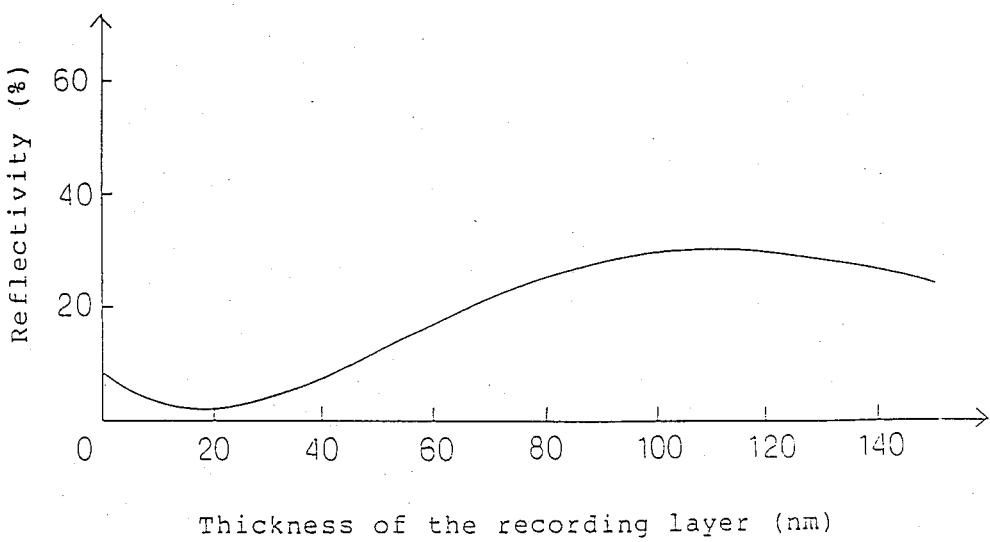
Figure 37:
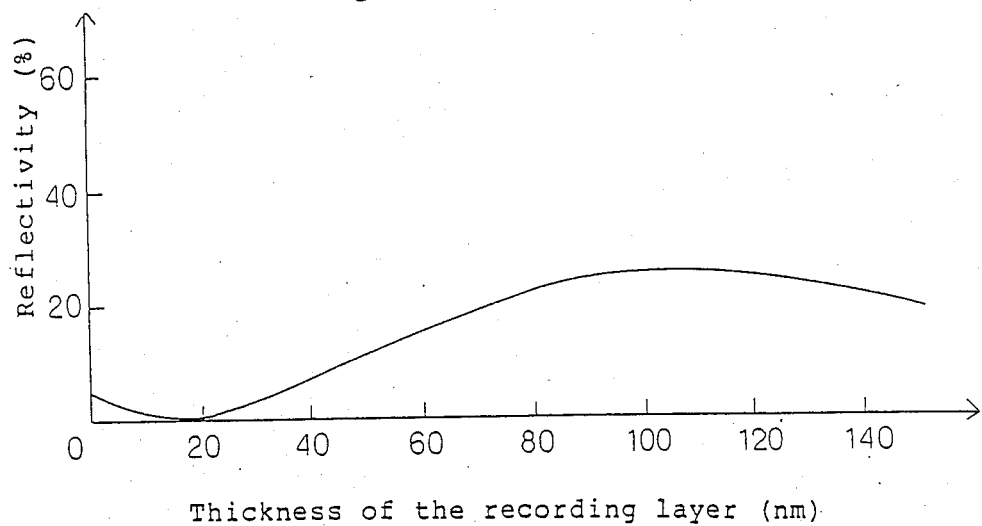
Figure 38:
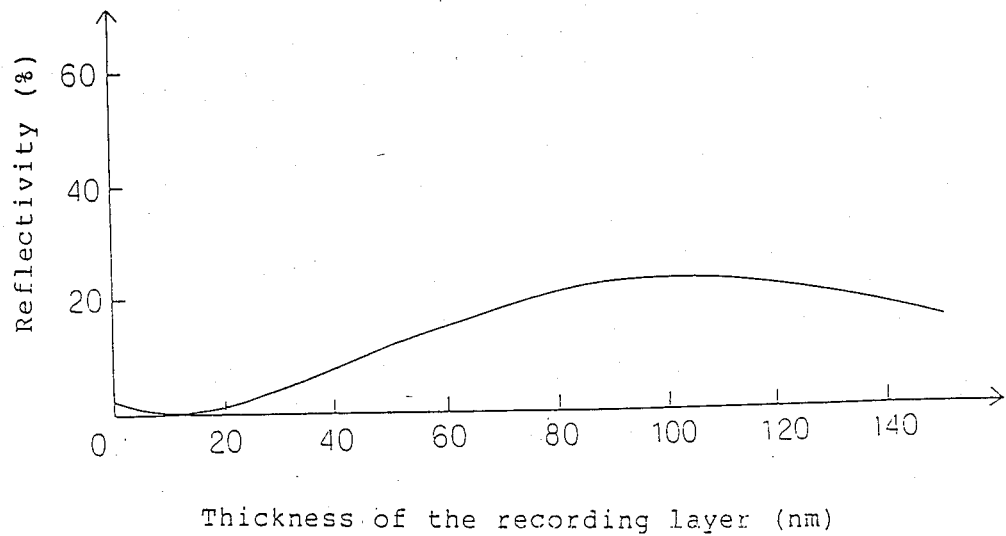

| Sample No. | First spacer layer Index of Refraction | First spacer layer Thickness (nm) | Second spacer layer Index of Refraction | Second spacer layer Thickness (nm) | $t_{min}$ (nm) | Drawing |
|---|---|---|---|---|---|---|
| 18 | 2.0 | 105 = $T_{max}$ | 1.5 | 130 = $T_{min}$ | 0 | FIG. 22 |
| 19 | 2.0 | 85 < $T_{max}$ = 105 | 1.5 | 80 < $T_{min}$ = 130 | 23 | FIG. 23 |
| 20 | 2.0 | 95 < $T_{max}$ = 105 | 1.4 | 80 < $T_{min}$ = 105 | 20 | FIG. 24 |
| 21 | 2.0 | 95 < $T_{max}$ = 105 | 1.6 | 80 < $T_{min}$ | 20 | FIG. 25 |
| 22 | 2.0 | 95 < $T_{max}$ = 105 | 1.7 | 90 < $T_{min}$ | 17 | FIG. 26 |
| 23 | 1.7 | 110 < $T_{max}$ = 120 | 1.4 | 90 < $T_{min}$ | 16 | FIG. 27 |
| 24 | 1.7 | 110 < $T_{max}$ = 120 | 1.5 | 110 < $T_{min}$ | 11 | FIG. 28 |
| 25 | 1.9 | 90 < $T_{max}$ = 110 | 1.4 | 90 < $T_{min}$ | 18 | FIG. 29 |
| 26 | 1.9 | 90 < $T_{max}$ = 110 | 1.5 | 90 < $T_{min}$ | 18 | FIG. 30 |
| 27 | 1.9 | 90 < $T_{max}$ = 110 | 1.6 | 90 < $T_{min}$ | 20 | FIG. 31 |
| 28 | 1.9 | 90 < $T_{max}$ = 110 | 1.7 | 120 < $T_{min}$ | 10 | FIG. 32 |
| 29 | 2.2 | 75 < $T_{max}$ = 95 | 1.4 | 70 < $T_{min}$ | 30 | FIG. 33 |
| 30 | 2.2 | 55 < $T_{max}$ = 95 | 1.5 | 100 < $T_{min}$ | 20 | FIG. 34 |
| 31 | 2.2 | 55 < $T_{max}$ = 95 | 1.6 | 100 < $T_{min}$ | 22 | FIG. 35 |
| 32 | 2.2 | 65 < $T_{max}$ = 95 | 1.7 | 100 < $T_{min}$ | 20 | FIG. 36 |
| 33 | 2.2 | 75 < $T_{max}$ = 95 | 1.9 | 100 < $T_{mix}$ | 16 | FIG. 37 |
| 34 | 2.2 | 85 < $T_{max}$ = 95 | 2.0 | 100 < $T_{max}$ | 13 | FIG. 38 |

As mentioned in the above, in case the recording layer 20 is made of a thin film of an organic material, the writing operation of data by the radiation of laser beam does not form a through hole but a pit to leave about 20 to 30% in thickness of the recording layer. Then, the recording layer 20 is preferably formed with a thickness of about 80 nm to provide a read signal of higher sensibility in the recording medium of sample Nos. 19 to 34. Because, when the initial thickness of the recording layer is about 80 nm, it becomes about 15 to 25 nm after the writing operation, at which the reflectivity of the recording medium is minimal. Thus, a big difference of the read signals between the recorded portion and the non-recorded portion can be obtained.

As mentioned above, according to the present invention, the first and second spacer layers 30 and 40 should not present a thickness respectively larger than $T_{max}$ and $T_{min}$ as defined above. The reason of these restriction will be explained in more detail.

A recording medium was prepared by forming a first spacer layer 30 on a substrate 10 with a thickness $T_{max}$ of 120 nm at which the reflectivity presents a maxinal value with respect to a beam having a wavelength of 830 um. The substrate 10 and the first spacer layer 30 had respectively an index of refraction of 1.5 and 1.7. Then, a second spacer layer 40 having an index of refraction of 1.4 and a recording layer 20 having a complex index of refraction of 2.1−i 0.6 were formed successively on the first spacer layer 30.

Figure 39:
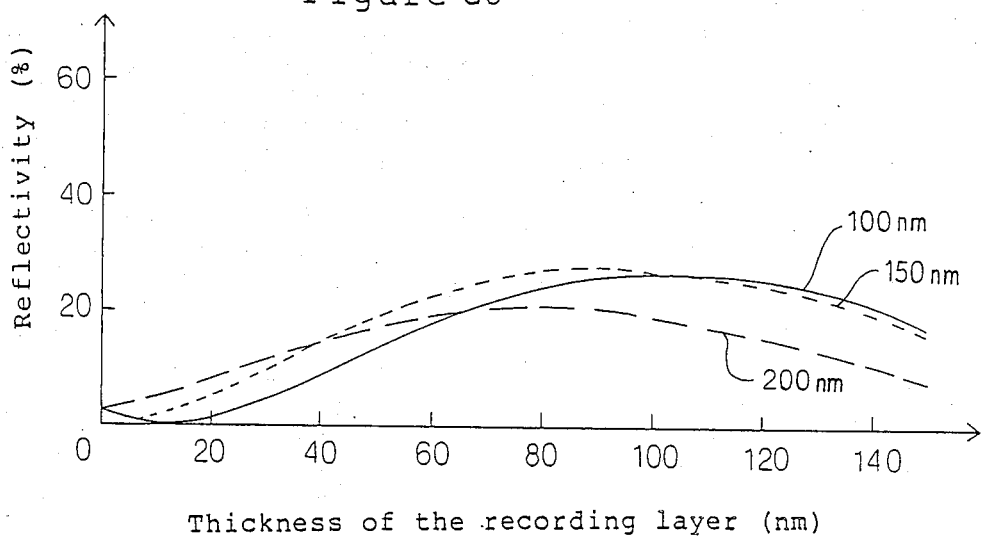
FIGS. 39 and 40 show respectively the relationship of the reflectivity and the thickness of the recording layer of the recording media, in which the thickness of the first and second spacer layers are varied in order to explain the restriction of the present invention.

The relationship between the thickness of the recording layer 20 and the reflectivity of the obtained recording medium is shown in FIG. 39 for the recording media of which the thickness of the second spacer layer 40 is respectively 100 nm, 50 nm and 200 nm.

When the thickness of the second spacer layer 40 is greater than the thickness $T_{min}$ (in this case, it is 150 nm), the variation of the reflectivity due to a decrease in thickness of the recording layer becomes smaller as compared with the recording medium of which the thickness of the second spacer layer 40 is equal to or smaller than $T_{min}$. Then, it is impossible to obtain read signals of high sensibility, when the thickness of the second spacer layer 40 is larger than $T_{min}$.

Further, a recording medium similar to that of which the reflectivity is shown in FIG. 39 was prepared, except that the thickness of the first spacer layer 30 was 170 nm which is larger than $T_{max}$ of 120 nm. The relationship between the thickness of the recording layer 20 and the reflectivity of the obtained recording medium is shown in FIG. 40 for the recording media of which the thickness of the second layer 40 was respectively 100 nm, 150 nm and 200 nm.

Figure 40:
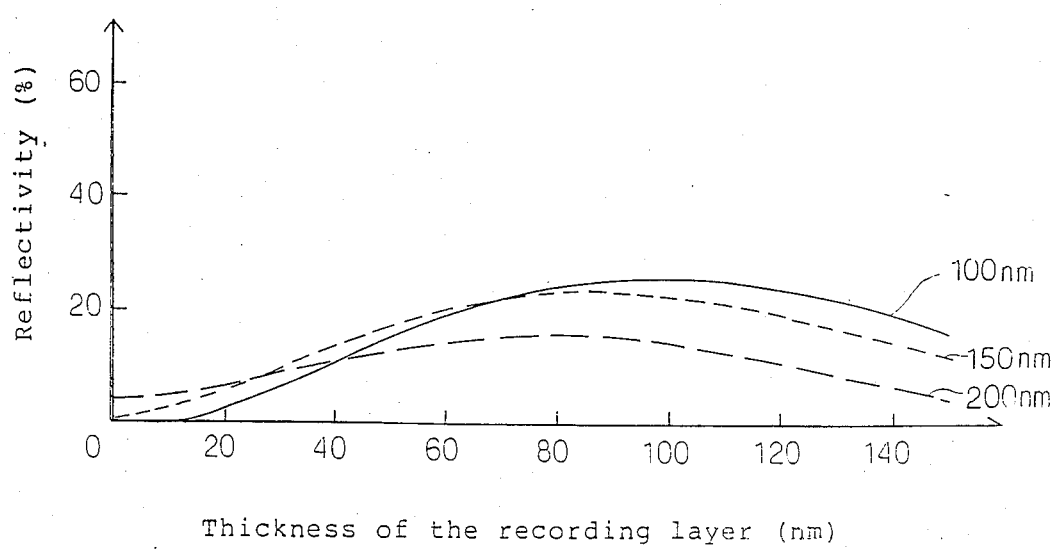

Comparing the variations of the reflectivity of the recording media shown by the curves of solid line in FIGS. 39 and 40, of which the thickness of the second spacer layer 40 is smaller than than the thickness $T_{min}$ (150 nm), it will be understood that, if the thickness of the first spacer layer 30 is larger than $T_{max}$, the variation of the reflectivity due to a decrease in thickness of the recording layer becomes smaller so that the intensity of the read signal becomes lowered.

The lower limits for the thickness of the first and second spacer layers 30 and 40 are determined so as to obtain a sufficiently large increase in the reflectivity and in the variation of the reflectivity.

In order to show the relationship between the thickness of the first and second spacer layers 30 and 40 and the change in the reflectivity of the recording medium, recording media were prepared using the first and second spacer layers shown in Table 3 and a recording layer having a complex index of $2.1 - i\ 0.6$ and a thickness of 80 nm. Increase in the reflectivity of each of the resulting recording media was determined and the result is shown in Table 3.

TABLE 3

| Sample No. | First spacer layer | | Second spacer layer | | Increase of Reflectivity (%) |
|---|---|---|---|---|---|
| | Index of Refraction | Thickness (nm) | Index of Refraction | Thickness (nm) | |
| 35 | 1.7 | 30 | 1.4 | 30 | −2.1 |
| 36 | 1.7 | 30 | 1.4 | 70 | 0 |
| 37 | 1.7 | 70 | 1.4 | 30 | −4.9 |
| 38 | 1.7 | 70 | 1.4 | 110 | +7.2 |
| 39 | 1.7 | 100 | 1.4 | 80 | +5.3 |
| 40 | 1.7 | 100 | 1.4 | 100 | +9.0 |
| 41 | 2.0 | 20 | 1.5 | 30 | −4.6 |
| 42 | 2.0 | 20 | 1.5 | 100 | −1.2 |
| 43 | 2.0 | 55 | 1.5 | 30 | −2.7 |
| 44 | 2.0 | 55 | 1.5 | 100 | +7.5 |
| 45 | 2.0 | 70 | 1.5 | 90 | +8.4 |

As understood from the result shown in Table 3, the thickness of each of the first and second spacer layers is preferably larger than $\lambda/8n$ (wherein $\lambda$ is the wavelength of the beam and n is the index of refraction of the layer) in order to obtain read signal of a high sensibility. That is, in case the wavelength of the beam is 830 nm and the spacer layers have an index of refraction between 1.4 and 2.0, each of the spacer layers has preferably a thickness larger than 50 nm.

The first and second spacer layers should be substantially transparent to the laser beam which is used in the read and write operation.

The first spacer layer should be composed of a material which has an index of refraction higher than the substrate. Such material includes oxides such as $CeO_2$, $Cr_2O_3$, $Fe_2O_3$, $Fe_3O_4$, $GeO_2$, $In_2O_3$, $MgO$, $MnO_2$, $MoO_3$, $Nb_2O_5$, $NiO$, $SiO$, $Sm_2O_3$, $SnO_2$, $Ta_2O_5$, $TeO_2$, $TiO_2$, $V_2O_5$, $WO_3$, $Y_2O_3$, $ZnO$, $ZrO_2$, nitrides such as $Si_3N_4$, $ZrN$, etc., carbides such as $ZrC$, sulfides such as $GeS$, $ZnS$, organic coloring agents such as cobalt phthalocyanine, copper phythalocyanine, magnesium phthalocyanine, nickel phthalocyanine, zinc phthalocyanine, various magnetic garnets, and Si, Se, Ge, B and the compounds thereof.

The second spacer layer should be composed of a material which has an index of refraction lower than the first spacer layer. Such material includes, for example, fluorides such as $AlF_3$, $BaF_2$, $CaF_2$, $CeF_3$, $DyF_3$, $ErF_3$, $EuF_3$, $GdF_3$, $HfF_4$, $HoF_3$, $LaF_3$, $LiF$, $MgF_2$, $NaF$, $NdF_3$, $PrF_3$, $SmF_3$, $SrF_2$, $YF_3$, $YbF_3$, oxides such as $Al_2O_3$, $CeO_2$, $Cr_2O_3$, $Dy_2O_3$, $Er_2O_3$, $Eu_2O_3$, $Fe_2O_3$, $Fe_3O_4$, $Gd_2O_3$, $GeO_2$, $HfO_2$, $Ho_2O_3$, $In_2O_3$, $Lu_2O_3$, $MgO$, $MnO_2$, $MoO_3$, $Nb_2O_5$, $NiO$, $SiO$, $SiO_2$, $Sm_2O_3$, $SnO_2$, $Ta_2O_5$, $TiO_2$, $V_2O_5$, $WO_3$, $Y_2O_3$, $ZnO$, $ZrO_2$, nitrides such as $ZrN$, carbides such as $ZrC$, sulfides such as $GeS$, $ZnS$, organic coloring agents such as cobalt phthalocyanine, copper phthalocyanine, molybdenum phthalocyanine, magnesium phthalocyanine, nickel phthalocyanine, zink phthalocyanine, Sudan Black B, photoresist, electron-beam resists, and other organic materials such as polyethylene.

In case the first spacer layer is composed of $SnO_2$ or copper phthalocyanine, the second spacer layer may be composed of at least one member selected from the group consisting of fluorides such as $AlF_3$, $BaF_2$, $CaF_2$, $CeF_3$, $DyF_3$, $ErF_3$, $EuF_3$, $GdF_3$, $HoF_3$, $LaF_3$, $LiF$, $MgF_2$, $NaF$, $NdF_3$, $PrF_3$, $SmF_3$, $SrF_2$, $YF_3$, $YbF_3$, oxides such as $Al_2O_3$, $CeO_2$, $Dy_2O_3$, $Er_2O_3$, $Eu_2O_3$, $GeO_2$, $Ho_2O_3$, $Lu_2O_3$, $MgO$, $SiO_2$, $Sm_2O_3$, $Y_2O_3$, organic coloring agents such as Sudan Black B, and organic materials such as guanine, crystal violet lactone.

In case the first spacer layer is composed of $NiO$ or $GeO_2$, the second spacer layer may be composed of at least one member selected from the group consisting of fluorides such as $AlF_3$, $BaF_2$, $CaF_2$, $CeF_3$, $DyF_3$, $ErF_3$, $EuF_3$, $GdF_3$, $HoF_3$, $LaF_3$, $LiF$, $MgF_2$, $NaF$, $NdF_3$, $PrF_3$, $SmF_3$, $SrF_2$, $YF_3$, $YbF_3$ oxides such as $Al_2O_3$, $Er_2O_3$, $Eu_2O_3$, $Ho_2O_3$, $Lu_2O_3$, $MgO$, $SiO_2$, $Sm_2O_3$, $Y_2O_3$, organic coloring agents such as Sudan Black B, and organic materials such as crystal violet lactone.

In case the first spacer layer is composed of MgO, the second spacer layer may be fluorides such as $MgF_2$ and oxides such as $Al_2O_3$ and $SiO_2$.

In case the first spacer layer is composed of Si, the second spacer layer may be composed of at least one member selected from the group consisting of fluorides such as $AlF_3$, $BaF_2$, $CaF_2$, $CeF_3$, $DyF_3$, $ErF_3$, $EuF_3$, $GdF_3$, $HfF_4$, $HoF_3$, $LaF_3$, $LiF$, $MgF_2$, $NaF$, $NdF_3$, $PrF_3$, $SmF_3$, $SrF_2$, $YF_3$, $YbF_3$, oxides such as $Al_2O_3$, $CeO_2$, $Cr_2O_3$, $Dy_2O_3$, $Er_2O_3$, $Eu_2O_3$, $Fe_2O_3$, $Fe_3O_4$, $Gd_2O_3$, $GeO_2$, $HfO_2$, $Ho_2O_3$, $In_2O_3$, $Lu_2O_3$, $MgO$, $MnO_2$, $MoO_3$, $Nb_2O_5$, $NiO$, $SiO$, $SiO_2$, $Sm_2O_3$, $SnO_2$, $Ta_2O_5$, $TiO_2$, $V_2O_5$, $WO_3$, $Y_2O_3$, $ZnO$, $ZrO_2$, nitrides such as $ZrN$, carbides such as $ZrC$, sulfides such as $GeS$ and $ZnS$, organic coloring agents such as cobalt phthalocyanine, copper phthalocyanine, molybdenum phthalocyanine, magnesium phthalocyanine, nickel phthalocyanine, zinc phthalocyanine, Sudan Black B, organic materials such as guanine, Crystal Violet lactone, 3,4,9,10-perylene tetra carboxylic dianhydrate.

According to the present invention, the fist and second spacer layers should be substantially transparent to the laser beam. This is because tha absorptive power of the recording layer of the recording medium of the present invention is lowered due to the presence of the first and second spacer layers. In other words, in the recording medium of the present invention has an improved reflectivity at the sacrifice of the transparency and the absorptive power as compared with the recording medium composed only of a substrate and a recording layer. Accordingly, if the absorptive power of the spacer layers is high, the beam energy would not be absorbed by the recording layer so that the recording sensibility is lowered to an extent that the recording medium cannot be practically used. Thus, the spacer layers should be substantially transparent.

It is preferable that the recording layer is mainly composed of an organic material which may be formed by the vapor deposition method or sputtering method. Such an organic material includes coloring agents such as squarylium, 5-amino-2,3-dicyano-1,4-naphthoquinone, vandyl phthalocyanine, titanyl phthalocyanine, aluminum phthalocyanine, aluminum chloride phthalocyanine, titan phthalocyanine, lead phthalocyanine, platinum phthalocyanine, Te containing plasma polymerized organic thin film, organic thin film containing Te bonded with alkyl radicals or Te bonded with fluoro carbons. Among them, coloring agents of 5-amino-8-substituted anilino-2,3-dicyano-1,4-naphthoquinone and 5,8-substituted anilino-2,3-dicyano-1,4-naphthoquinone and the mixture thereof or the metallic complex thereof are preferably used as the recording layer according to the present invention. These coloring agents containing as substituted radical alkoxyl radicals or alkyl radicals of which the number of carbons is equal to or lower than 4 is most preferable.

Various materials may be used as the substrate. Among them, synthetic resin, glass and procelain are preferably used as the substrate. Such a synthetic resin includes acryl resin such as polymethylmethacrylate, polycarbonate, polyetherimido, polysulfone, epoxy resin, vinyl chloride resin. The substrate may be in the form of a disc, sheet or tape.

The writing operation of data in the recording medium according to the present invention may be conducted to form a pit in the recording layer by the radiation of laser beam. In the case of a disc medium, pits are formed on tracks which are formed concentrically with each other or helically. In order to conduct the writing operation preciely with a predetermined interval in a plurality of tracks, the substrate is usually provided with guide groove for laser beam. The width of the guide groove is nearly the same as the beam diameter, so that he beam incident on the guide groove is diffracted. Thus, the space distribution of the intensity of the diffracted beam is formed in function of the deviation of the beam axis from the center of the guide groove. Then, the beam axis can be controlled so as to radiate the laser beam at the center of the guide groove by means of a servo control system.

The guide groove is usually of 0.3 to 1.2 μm in width and the depth thereof may be 1/12 to ¼ times of the wavelength of the laser beam used for the write and read operation.

It is preferable to form the guide grooves on the substrate.

The invention will be explained in more detail by way of Examples; however these examples are intended to illustrate the invention and are not contrued to limit the scope of the invention.

EXAMPLE 1

A disc of acrylic acid resin and having a guide groove was used as a substrate, which was 15 mm in inner diameter, 120 mm in outer diameter and 1.2 mm in thickness. There were formed by vapor deposition on the substrate a first spacer layer of magnesium oxide in a thickness of 121 nm, a second spacer layer of magnesium fluoride in a thickness of 82 nm and a recording layer of organic coloring agent containing more than 85% of 5-amino-8-(p-ethoxyanyryno)-2,3-dicyano-1,4-naphthoquinone in a thickness of 80 nm.

The vapor deposition of the spacer layers was conducted by monitoring the reflectivity of a laser beam of a wavelength of 830 nm which was incident on the surface of the substrate. The vapor deposition of the first spacer layer of magnesium oxide was terminated when the reflectivity presented a maximal value of 10.7%, while the vapor deposition of the second spacer layer of magnesium fluoride was terminated when the reflectivity was 4.7% which had not attained the minimal value.

The thus obtained optical disc presented a reflectivity of 22.0% with respect to the laser beam incident on the substrate and thus the read signal and servo control signal were obtained at a high sensibility.

EXAMPLE 2

An optical disc similar to that of Example 1 was prepared except that the second spacer layer was formed in a thickness of 101 nm by vapor deposition of silicon dioxide. The vapor deposition of the second spacer layer of silicon dioxide was terminated when the reflectivity was 2.3% which had not attained the minimal value.

The thus obtained optical disc presented a reflectivity of 21.5% with respect to the laser beam incident on the substrate and thus the read signal and servo control signal were obtained at a high sensibility.

EXAMPLE 3

An optical disc similar to that of Example 1 was prepared except that the first spacer layer of germanium oxide and the second spacer layer of magnesium fluoride were formed respectively in a thickness of 113 nm and 69 nm by vapor deposition. The vapor deposition of the first spacer layer of germanium oxide was terminated when the reflectivity presented a maximal value of 15.6%, while the vapor deposition of the second spacer layer of magnesium fluoride was terminated when the reflectivity was 9.4% which has not attained the minimal value.

The thus obtained optical disc presented a reflectivity of 22.7% with respect to the laser beam incident on the substrate and thus the read signal and servo control signal were obtained at a high sensibility.

EXAMPLE 4

An optical disc similar to that of Example 3 was prepared except that the second spacer layer was formed in a thickness of 80 nm by vapor deposition of silicon dioxide. The vapor deposition of the second spacer layer of silicon dioxide was terminated when the reflectivity was 6.4% which had not attained the minimal value.

The thus obtained optical disc presented a reflectivity of 23.1% with respect to the laser beam incident on the substrate and thus the read signal and servo control signal were obtained at a high sensibility.

EXAMPLE 5

An optical disc similar to that of Example 3 was prepared except that the second spacer layer of aluminum oxide was formed in a thickness of 88 nm by vapor deposition. The vapor deposition of the second spacer layer of aluminum oxide was terminated when the reflectivity was 4.2% which had not attained the minimal value.

The thus obtained optical disc presented a reflectivity of 21.6% with respect to the laser beam incident on the substrate and thus the read signal and servo control signal were obtained at a high sensibility.

EXAMPLE 6

An optical disc similar to that of Example 1 was prepared except that the first spacer layer of cerium oxide and the second spacer layer of silicon dioxide were formed respectively in a thickness of 110 nm and 78 nm by vapor deposition. The vapor deposition of the first spacer layer of cerium oxide was terminated when the reflectivity presented a maximal value of 17.0 %, while the vapor deposition of the second spacer layer of silicon dioxide was terminated when the reflectivity was 7.6% which had not attained the minimal value.

The thus obtained optical disc presented a reflectivity of 23.8% with respect to the laser beam incident on the substrate and thus the read signal and servo control signal were obtained at a high sensibility.

EXAMPLE 7

An optical disc similar to that of Example 1 was prepared except that the first spacer layer of copper phthalocyanine and the second spacer layer of magnesium fluoride were formed respectively in a thickness of 104 nm and 68 nm by vapor deposition. The vapor deposition of the first spacer layer of copper phthalocyanine was terminated when the reflectivity presented a maximal value of 20.7%, while the vapor deposition of the second spacer layer of magnesium fluoride was terminated when the reflectivity was 13.6% which had not attained the minimal value.

The thus obtained optical disc presented a reflectivity of 25.9% with respect to the laser beam incident on the substrate and thus the read signal and servo control signal were obtained at a high sensibility.

EXAMPLE 8

An optical disc similar to that of Example 7 was prepared except that the second spacer layer was formed in a thickness of 70 nm by vapor deposition of silicon dioxide. The vapor deposition of the second spacer layer of silicon dioxide was terminated when the reflectivity was 11.6% which had not attained the minimal value.

The thus obtained optical disc presented a reflectivity of 24.4% with respect to the laser beam incident on the substrate and thus the read signal and servo control signal were obtained at a high sensibility.

EXAMPLE 9

An optical disc similar to that of Example 7 was prepared except that the second spacer layer was formed in a thickness of 78 nm by vapor deposition of aluminum oxide. The vapor deposition of the second spacer layer of aluminum oxide was terminated when the reflectivity was 8.2% which had not attained the minimal value.

The thus obtained optical disc presented a reflectivity of 24.2% with respect to the laser beam incident on the substrate and thus the read signal and servo control signal were obtained at a high sensibility.

EXAMPLE 10

An optical disc similar to that of Example 7 was prepared except that the second spacer layer was formed in a thickness of 81 nm by vapor deposition of yttrium oxide. The vapor deposition of the second spacer layer of yttrium oxide was terminated when the reflectivity was 6.8% which had not attained the minimal value.

The thus obtained optical disc presented a reflectivity of 23.4% with respect to the laser beam incident on the substrate and thus the read signal and servo control signal were obtained at a high sensibility.

EXAMPLE 11

An optical disc similar to that of Example 7 was prepared except that the second spacer layer was formed in a thickness of 83 nm by vapor deposition of magnesium oxide. The vapor deposition of the second spacer layer of magnesium oxide was terminated when the reflectivity was 5.6% which had not attained the minimal value.

The thus obtained optical disc presented a reflectivity of 21.7% with respect to the laser beam incident on the substrate and thus the read signal and servo control signal were obtained at a high sensibility.

EXAMPLE 12

An optical disc similar to that of Example 1 was prepared except that the first spacer layer of nickel oxide and the second spacer layer of magnesium fluoride were formed respectively in a thickness of 103 nm and 70 nm by vapor deposition. The vapor deposition of the first spacer layer of nickel oxide was terminated when the reflectivity presented a maximal value of 21.4%, while the vapor deposition of the second spacer layer of magnesium fluoride was terminated when the reflectivity was 13.8% which had not attained the minimal value.

The thus obtained optical disc presented a reflectivity of 27.2% with respect to the laser beam incident on the substrate and thus the read signal and servo control signal were obtained at a high sensibility.

EXAMPLE 13

An optical disc similar to that of Example 12 was prepared except that the second spacer layer was formed in a thickness of 71 nm by vapor deposition of silicon dioxide. The vapor deposition of the second spacer layer of silicon dioxide was terminated when the reflectivity was 11.9% which had not attained the minimal value.

The thus obtained optical disc presented a reflectivity of 25.3% with respect to the laser beam incident on the substrate and thus the read signal and servo control signal were obtained at a high sensibility.

EXAMPLE 14

An optical disc similar to that of Example 12 was prepared except that the second spacer layer was formed in a thickness of 80 nm by vapor deposition of aluminum oxide. The vapor deposition of the second spacer layer of aluminum oxide was terminated when the reflectivity was 8.0% which had not attained the minimal value.

The thus obtained optical disc presented a reflectivity of 25.3% with respect to the laser beam incident on the substrate and thus the read signal and servo control signal were obtained at a high sensibility.

EXAMPLE 15

An optical disc similar to that of Example 1 was prepared except that the first spacer layer of nickel oxide and the second spacer layer of magnesium oxide were formed respectively in a thickness of 103 nm and 83 nm by vapor deposition. The vapor deposition of the first spacer layer of nickel oxide was terminated when the reflectivity presented a maximal value of 21.4%, while the vapor deposition of the second spacer layer of magnesium oxide was terminated when the reflectivity was 5.8% which had not attained the minimal value.

The thus obtained optical disc presented a reflectivity of 22.4% with respect to the laser beam incident on the substrate and thus the read signal and servo control signal were obtained at a high sensibility.

EXAMPLE 16

An optical disc similar to that of Example 1 was prepared except that the first spacer layer of tin oxide and the second spacer layer of magnesium fluoride were formed respectively in a thickness of 94 nm and 62 nm by vapor deposition. The vapor deposition of the first spacer layer of tin oxide was terminated when the reflectivity presented a maximal value of 27.8%, while the vapor deposition of the second spacer layer of magnesium oxide was terminated when the reflectivity was 21.0% which had not attained the minimal value.

The thus obtained optical disc presented a reflectivity of 28.7% with respect to the laser beam incident on the substrate and thus the read signal and servo control signal were obtained at a high sensibility.

EXAMPLE 17

An optical disc similar to that of Example 16 was prepared except that the second spacer layer was formed in a thickness of 64 nm by vapor deposition of silicon dioxide. The vapor deposition of the second spacer layer of silicon dioxide was terminated when the reflectivity was 18.7% which had not attained the minimal value.

The thus obtained optical disc presented a reflectivity of 27.7% with respect to the laser beam incident on the substrate and thus the read signal and servo control signal were obtained at a high sensibility.

EXAMPLE 18

An optical disc similar to that of Example 16 was prepared except that the second spacer layer was formed in a thickness of 73 nm by vapor deposition of aluminum oxide. The vapor deposition of the second spacer layer of aluminum oxide was terminated when the reflectivity was 14.0% which had not attained the minimal value.

The thus obtained optical disc presented a reflectivity of 28.9% with respect to the laser beam incident on the substrate and thus the read signal and servo control signal were obtained at a high sensibility.

EXAMPLE 19

An optical disc similar to that of Example 16 was prepared except that the second spacer layer was formed in a thickness of 80 nm by vapor deposition of magnesium oxide. The vapor deposition of the second spacer layer of magnesium oxide was terminated when the reflectivity was 9.1% which had not attained the minimal value.

The thus obtained optical disc presented a reflectivity of 27.7% with respect to the laser beam incident on the substrate and thus the read signal and servo control signal were obtained at a high sensibility.

EXAMPLE 20

An optical disc similar to that of Example 16 was prepared except that the second spacer layer was formed in a thickness of 88 nm by vapor deposition of germanium oxide. The vapor deposition of the second spacer layer of germanium oxide was terminated when the reflectivity was 4.1% which had not attained the minimal value.

The thus obtained optical disc presented a reflectivity of 24.7% with respect to the laser beam incident on the substrate and thus the read signal and servo control signal were obtained at a high sensibility.

EXAMPLE 21

An optical disc similar to that of Example 16 was prepared except that the second spacer layer was formed in a thickness of 88 nm by vapor deposition of a coloring agent composed of copper phthalocyanine. The vapor deposition of the second spacer layer of copper phthalocyanine was terminated when the reflectivity was 2.7% which had not attained the minimal value.

The thus obtained optical disc presented a reflectivity of 20.2% with respect to the laser beam incident on the substrate and thus the read signal and servo control signal were obtained at a high sensibility.

EXAMPLE 22

A disc of acrylic acid resin and having a guide groove was used as a substrate, which was 15 mm in inner diameter, 120 mm in outer diameter and 1.2 mm in thickness. There were formed by vapor deposition on the substrate a first spacer layer of copper phthalocyanine in a thickness of 104 nm, a second spacer layer of silicon dioxide in a thickness of 68 nm and a recording layer of organic coloring agent containing more than 85% of 5-amino-8-(p-methylanyryno)-2,3-dicyano-1,4-naphthoquinone in a thickness of 80 nm.

The vapor deposition of the spacer layers was conducted by monitoring the reflectivity of a laser beam of a wavelength of 830 nm which was incident on the surface of the substrate. The vapor deposition of the first spacer layer of copper phthalocyanine was terminated when the reflectivity presented a maximal value of 20.7%, while the vapor deposition of the second spacer layer of silicon dioxide was terminated when the reflectivity was 12.0% which had not attained the minimal value.

The thus obtained optical disc presented a reflectivity of 28.5% with respect to the laser beam incident on the substrate and thus the read signal and servo control signal were obtained at a high sensibility.

EXAMPLE 23

An optical disc similar to that of Example 1 was prepared except that the first spacer layer of magnesium oxide and the second spacer layer of silicon dioxide were formed respectively in a thickness of 121 nm and 100 nm by vapor deposition and that the recording layer was composed of an organic thin film containing more than 90% of coloring agent of 5-amino-8-(p-propoxyanyryno)-2,3-dicyano-1,4-naphtoquinone. The vapor deposition of the first spacer layer of magnesium oxide was terminated when the reflectivity presented a maximal value of 10.7%, while the vapor deposition of the second spacer layer of silicon dioxide was terminated when the reflectivity was 2.4% which had not attained the minimal value.

The thus obtained optical disc presented a reflectivity of 19.0% with respect to the laser beam incident on the substrate and thus the read signal and servo control signal were obtained at a high sensibility.

EXAMPLE 24

An optical disc similar to that of Example 1 was prepared except that the first spacer layer of magnesium oxide and the second spacer layer of silicon dioxide were formed respectively in a thickness of 110 nm and 110 nm by vapor deposition and that the recording layer was composed of an organic thin film containing more than 90% of coloring agent of 5-amino-8-(p-ethoxyanyryno)-2,3-dicyano-1,4-naphthoquinone.

The vapor deposition of the spacer layers was conducted by monitoring the reflectivity of a laser beam of a wavelength of 830 nm which was incident on the surface of the substrate. The vapor deposition of the first spacer layer of magnesium oxide was terminated when the reflectivity was 10.6% which had not yet attained the maximal value, while the vapor deposition of the second spacer layer of silicon dioxide was terminated when the reflectivity was 2.1% which had not attained the minimal value.

The thus obtained optical disc presented a reflectivity of 21.6% with respect to the laser beam incident on the substrate and thus the read signal and servo control signal were obtained at a high sensibility.

EXAMPLE 25

An optical disc similar to that of Example 24 was prepared except that the second spacer layer was formed in a thickness of 90 nm by vapor deposition of magnesium fluoride. The vapor deposition of the second spacer layer of magnesium fluoride was terminated when the reflectivity was 4.4% which had not attained the minimal value.

The thus obtained optical disc presented a reflectivity of 22.4% with respect to the laser beam incident on the substrate and thus the read signal and servo control signal were obtained at a high sensibility.

EXAMPLE 26

An optical disc similar to that of Example 24 was prepared except that the first spacer layer of copper phthalocyanine and the second spacer layer of magnesium fluoride were formed respectively in a thickness of 95 nm and 80 nm by vapor deposition. The vapor deposition of the first spacer layer of copper phthalocyanine was terminated when the reflectivity was 20.4% which and not yet attained the maximal value, while the vapor deposition of the second spacer layer of magnesium fluoride was terminated when the reflectivity was 12.2% which had not attained the minimal value.

The thus obtained optical disc presented a reflectivity of 28.1% with respect to the laser beam incident on the substrate and thus the read signal and servo control signal were obtained at a high sensibility.

EXAMPLE 27

An optical disc similar to that of Example 24 was prepared except that the first spacer layer of copper phthalocyanine and the second spacer layer of silicon dioxide were formed respectively in a thickness of 85 nm and 80 nm by vapor deposition. The vapor deposition of the first spacer layer of copper phthalocyanine was terminated when the reflectivity was 19.6% which had not yet attained the maximal value, while the vapor deposition of the second spacer layer of silicon dioxide was terminated when the reflectivity was 11.5% which had not attained the minimal value.

The thus obtained optical disc presented a reflectivity of 23.0% with respect to the laser beam incident on the substrate and thus the read signal and servo control signal were obtained at a high sensibility.

EXAMPLE 28

An optical disc similar to that of Example 24 was prepared except that the first spacer layer of nickel phthalocyanine and the second spacer layer of aluminum oxide were formed respectively in a thickness of 95 nm and 80 nm by vapor deposition. The vapor deposition of the first spacer layer of copper phthalocyanine was terminated when the reflectivity was 20.4% which had not yet attained the maximal value, while the vapor deposition of the second spacer layer of aluminum oxide was terminated when the reflectivity was 9.2% which had not attained the minimal value.

The thus obtained optical disc presented a reflectivity of 23.0% with respect to the laser beam incident on the substrate and thus the read signal and servo control signal were obtainded at a high sensibility.

EXAMPLE 29

An optical disc similar to that of Example 24 was prepared except that the first spacer layer of cobalt phthalocyanine and the second spacer layer of magnesium oxied were formed respectively in a thickness of 95 nm and 90 nm by vapor deposition. The vapor deposition of the first spacer layer of cobalt phthalocyanine was terminated when the reflectivity was 20.4% which had not yet attained the maximal value, while the vapor deposition of the second spacer layer of magnesium oxide was terminated when the reflectivity was 5.5% which had not attained the minimal value.

The thus obtained optical disc presented a reflectivity of 21.7% with respect to the laser beam incident on the substrate and thus the read signal and servo control signal were obtained at a high sensibility.

EXAMPLE 30

An optical disc similar to that of Example 26 was prepared except that the second spacer layer of yttrium oxide was formed in a thickness of 85 nm by vapor deposition. The vapor deposition of the second spacer layer of yttrium oxide was terminated when the reflectivity was 7.3% which had not attained the minimal value.

The thus obtained optical disc presented a reflectivity of 22.8% with respect to the laser beam incident on the substrate and thus the read signal and servo control signal were obtained at a high sensibility.

EXAMPLE 31

An optical disc similar to that of Example 24 was prepared except that the first spacer layer of germanium oxide and the second spacer layer of magnesium fluoride were formed respectively in a thickness of 90 nm and 90 nm by vapor deposition. The vapor deposition of the first spacer layer of germanium oxide was terminated when the reflectivity was 14.7% which had not yet attained the maximal value, while the vapor deposition of the second spacer layer of magnesium fluoride was terminated when the reflectivity was 7.6% which had not attained the minimal value.

The thus obtained optical disc presented a reflectivity of 24.5% with respect to the laser beam incident on the substrate and thus the read signal and servo control signal were obtained at a high sensibility.

EXAMPLE 32

An optical disc similar to that of Example 31 was prepared except that the second spacer layer was formed in a thickness of 90 nm by vapor deposition of silicon dioxide. The vapor deposition of the second spacer layer of silicon dioxide was terminated when the reflectivity was 6.8% which had not attained the minimal value.

The thus obtained optical disc presented a reflectivity of 21.6% with respect to the laser beam incident on the substrate and thus the read signal and servo control signal were obtained at a high sensibility.

EXAMPLE 33

An optical disc similar to that of Example 31 was prepared except that the second spacer layer was formed in a thickness of 90 nm by vapor deposition of aluminum oxide. The vapor deposition of the second spacer layer of aluminum oxide was terminated when the reflectivity was 6.4% which had not attained the minimal value.

The thus obtained optical disc presented a reflectivity of 18.7% with respect to the laser beam incident on the substrate and thus the read signal and servo control signal were obtained at a high sensibility.

EXAMPLE 34

An optical disc similar to that of Example 24 was prepared except that the first spacer layer of cerium oxide and the second spacer layer of silicon dioxide were formed respectively in a thickness of 90 nm by vapor deposition. The vapor deposition of the first spacer layer of cerium oxide was terminated when the reflectivity was 16.2% which had not yet attained the maximal value, while the vapor deposition of the second spacer layer of magnesium fluoride was terminated when the reflectivity was 7.3% which had not attained the minimal value.

The thus obtained optical disc presented a reflectivity of 23.2% with respect to the laser beam incident on the substrate and thus the read signal and servo control signal were obtained at a high sensibility.

EXAMPLE 35

An optical disc similar to that of Example 24 was prepared except that the first spacer layer of nickel oxide and the second spacer layer of magnesium fluoride were formed respectively in a thickness of 95 nm and 80 nm by vapor deposition. The vapor deposition of the first spacer layer of nickel oxide was terminated when the reflectivity was 21.2% which had not yet attained the maximal value, while the vapor deposition of the second spacer layer of magnesium fluoride was terminated when the reflectivity was 12.7% which had not attained the minimal value.

The thus obtained optical disc presented a reflectivity of 28.9% with respect to the laser beam incident on the substrate and thus the read signal and servo control signal were obtained at a high sensibility.

EXAMPLE 36

An optical disc similar to that of Example 24 was prepared except that the first spacer layer of nickel oxide and the second spacer layer of silicon dioxide were formed respectively in a thickness of 85 nm and 80 nm by vapor deposition. The vapor deposition of the first spacer layer of nickel oxide was terminated when the reflectivity was 20.3% which had not yet attained the maximal value, while the vapor deposition of the second spacer layer of silicon dioxide was terminated when the reflectivity was 11.9% which had not attained the minimal value.

The thus obtained optical disc presented a reflectivity of 23.8% with respect to the laser beam incident on the substrate and thus the read signal and servo control signal were obtained at a high sensibility.

EXAMPLE 37

An optical disc similar to that of Example 24 was prepared except that the first spacer layer of nickel oxide and the second spacer layer of aluminum oxide were formed respectively in a thickness of 95 nm and 80 nm by vapor deposition. The vapor deposition of the first spacer layer of nickel oxide was terminated when the reflectivity was 21.2% which had not yet attained the maximal value, while the vapor deposition of the second spacer layer of aluminum oxide was terminated when the reflectivity was 9.4% which had not attained the minimal value.

The thus obtained optical disc presented a reflectivity of 23.8% with respect to the laser beam incident on the substrate and thus the read signal and servo control signal were obtained at a high sensibility.

EXAMPLE 38

An optical disc similar to that of Example 37 was prepared except that the second spacer layer of magnesium oxide was formed in a thickness of 90 nm by vapor deposition. The vapor deposition of the second spacer layer of magnesium oxide was terminated when the reflectivity was 5.5% which had not attained the minimal value.

The thus obtained optical disc presented a reflectivity of 22.5% with respect to the laser beam incident on the substrate and thus the read signal and servo control signal were obtained at a high sensibility.

EXAMPLE 39

An optical disc similar to that of Example 24 was prepared except that the first spacer layer of tin oxide and the second spacer layer of magnesium fluoride were formed respectively in a thickness of 75 nm and 70 nm by vapor deposition. The vapor deposition of the first spacer layer of tin oxide was terminated when the reflectivity was 25.9% which had not yet attained the maximal value, while the vapor deposition of the second spacer layer of magnesium fluoride was terminated when the reflectivity was 20.5% which had not attained the minimal value.

The thus obtained optical disc presented a reflectivity of 25.3% with respect to the laser beam incident on the substrate and thus the read signal and servo control signal were obtained at a high sensibility.

EXAMPLE 40

An optical disc similar to that of Example 24 was prepared except that the first spacer layer of tin oxide and the second spacer layer of silicon dioxide were formed respectively in a thickness of 55 nm and 100 nm by vapor deposition. The vapor deposition of the first spacer layer of tin oxide was terminated when the reflectivity was 20.5% which had not yet attained the maximal value, while the vapor deposition of the second spacer layer of silicon dioxide was terminated when the reflectivity was 12.0% which had not attained the minimal value.

The thus obtained optical disk presented a reflectivity of 26.3% with respect to the laser beam incident on the substrate and thus the read signal and servo control signal were obtained at a high sensibility.

EXAMPLE 41

An optical disc similar to that of Example 40 was prepared except that the second spacer layer was formed in a thickness of 100 nm by vapor deposition of aluminum oxide. The vapor deposition of the second spacer layer of aluminum oxide was terminated when the reflectivity was 11.0% which had not attained the minimal value.

The thus obtained optical disc presented a reflectivity of 23.9% with respect to the laser beam incident on the substrate and thus the read signal and servo control signal were obtained at a high sensibility.

EXAMPLE 42

An optical disc similar to that of Example 24 was prepared except that the first spacer layer of tin oxide and the second spacer layer of magnesium oxide were formed respectively in a thickness of 65 nm and 100 nm by vapor deposition. The vapor deposition of the first spacer layer of tin oxide was terminated when the reflectivity was 23.6% which had not yet attained the maximal value, while the vapor deposition of the second spacer layer of magnesium oxide was terminated when the reflectivity was 8.7% which had not attained the minimal value.

The thus obtained optical disc presented a reflectivity of 24.8% with respect to the laser beam incident on the substrate and thus the read signal and servo control signal were obtained at a high sensibility.

EXAMPLE 43

An optical disc similar to that of Example 24 was prepared except that the first spacer layer of tin oxide and the second spacer layer of germanium oxide were formed respectively in a thickness of 75 nm and 100 nm by vapor deposition. The vapor deposition of the first spacer layer of tin oxide was terminated when the reflectivity was 25.9% which had not yet attained the maximal value, while the vapor deposition of the second spacer layer of germanium oxide was terminated when the reflectivity was 5.0% which had not attained the minimal value.

The thus obtained optical disc presented a reflectivity of 23.5% with respect to the laser beam incident on the substrate and thus the read signal and servo control signal were obtained at a high sensibility.

EXAMPLE 44

An optical disc similar to that of Example 24 was prepared except that the first spacer layer of tin oxide and the second spacer layer of copper phthalocyanine were formed respectively in a thickness of 85 nm and 100 nm by vapor deposition. The vapor deposition of the first spacer layer of tin oxide was terminated when the reflectivity was 27.3% which had not yet attained the maximal value, while the vapor deposition of the second spacer layer of copper phthalocyanine was terminated when the reflectivity was 2.3% which had not attained the minimal value.

The thus obtained optical disc presented a reflectivity of 20.1% with respect to the laser beam incident on the substrate and thus the read signal and servo control signal were obtained at a high sensibility.

EXAMPLE 45

An optical disc similar to that of Example 24 was prepared except that the first spacer layer of copper phthalocyanine and the second spacer layer of magnesium oxide were formed respectively in a thickness of 95 nm and 90 nm by vapor deposition. The vapor deposition of the first spacer layer of copper phthalocyanine was terminated when the reflectivity was 20.4% which had not yet attained the maximal value, while the vapor deposition of the second spacer layer of magnesium oxide was terminated when the reflectivity was 5.5% which had not attained the minimal value.

The thus obtained optical disc presented a reflectivity of 21.7% with respect to the laser beam incident on the substrate and thus the read signal and servo control signal were obtained at a high sensibility.

EXAMPLE 46

An optical disc similar to that of Example 24 was prepared except that the first spacer layer of copper phthalocyanine and the second spacer layer of silicon dioxide were formed respectively in a thickness of 85 nm and 80 nm by vapor deposition and that the recording layer was formed with a organic coloring agent containing more than 95% of 5-amino-8-(p-methylanyryno)-2,3-dicyano-1,4-naphthoquinone in a thickness of 80 nm.

The vapor deposition of the first spacer layer of copper phthalocyanine was terminated when the reflectivity was 19.6% which had not yet attained the maximal value, while the vapor deposition of the second spacer layer of silicon dioxide was terminated when the reflectivity was 11.5% which had not attained the minimal value.

The thus obtained optical disc presented a reflectivity of 27.8% with respect to the laser beam incident on the substrate and thus the read signal and servo control signal were obtained at a high sensibility.

The invention has thus been shown and described with reference to specific embodiments. However, it should be noted that the invention is in no way limited to the details of the illustrated structures but changes and modifications may be made within the scope of the appended claims.

What is claimed:

1. Optical recording medium, in which data is recorded and from which data is read by the radiation of laser beam, said optical recording medium comprising:
   a substrate transparent to the laser beam;
   a first spacer layer formed on the substrate, being substantially transparent to the laser beam and having a higher refractive index than the substrate with respect to said laser beam, the thickness of the first spacer layer being approximately equal to a thickness at which the first spacer layer, when combined only with the substrate, presents a maximal reflectivity with respect to a laser beam being incident on the substrate;
   a second spacer layer formed on the first spacer layer, being substantially transparent to the laser beam and having a lower refractive index than the first layer with respect to said laser beam, the thickness of the second spacer layer being approximately equal to a thickness at which the second spacer layer, when combined only with said first spacer layer and the substrate, presents a minimal reflectivity with respect to a laser beam being incident on the substrate; and a recording layer formed on the second spacer layer and for storing data therein by the radiation of laser beam;

said laser beam being irradiated from said substrate to said recording layer.

2. Optical recording medium as claimed in claim 1, wherein the thickness of the first spacer layer is equal to a thickness at which the first spacer layer, when combined only with the substrate, presents a maximal reflectivity with respect to a laser beam being incident on the substrate.

3. Optical recording medium as claimed in claim 1, wherein the thickness of the first spacer layer is smaller than a thickness at which the first spacer layer, when combined only with the substrate, presents a maximal reflectivity with respect to a laser beam being incident on the substrate.

4. Optical recording medium as claimed in claim 1, wherein the thickness of the recording layer is adjusted so that the recording medium presents a minimal reflectivity, when the thickness of the recording layer becomes about 15 to 25% of the initial thickness due to the radiation of the laser beam.

5. Optical recording medium as claimed in claim 1, wherein the thickness of each of the first and second spacer layers is larger than $\lambda/8n$ ($\lambda$ indicates the wavelength of the employed beam and n indicates the index of refraction of the layer).

6. Optical recording medium as claimed in claim 1, wherein the thickness of each of the first and second spacer layers is larger than 50 nm.

7. Optical recording medium as claimed in claim 1, wherein the thickness of the recording layer is about 80 nm.

8. Optical recording medium as claimed in claim 1, wherein the first spacer layer is composed of one member selected from the group consisting of oxides, nitrides, carbides, sulfides, organic coloring agent, magnetic garnet, and Si, Se, B and the compounds thereof.

9. Optical recording medium as claimed in claim 8, wherein the first spacer layer is composed of one member selected from the group consisting of $CeO_2$, $Cr_2O_3$, $Fe_2O_3$, $Fe_3O_4$, $GeO_2$, $In_2O_3$, $MgO$, $MnO_2$, $MoO_3$, $Nb_2O_5$, $NiO$, $SiO$, $Sm_2O_3$, $SnO_2$, $Ta_2O_5$, $TeO_2$, $TiO_2$, $V_2O_5$, $WO_3$, $Y_2O_3$, $ZnO$, $ZrO_2$.

10. Optical recording medium as claimed in claim 8, wherein the first spacer layer is composed of one member selected from the group consisting of $Si_3N_4$, $ZrN$, $ZrC$, $GeS$, $ZnS$, organic coloring agents of cobalt phthalocyanine, copper phythalocyanine, magnesium phthalocyanine, nickel phthalocyanine, zinc phthalocyanine.

11. Optical recording medium as claimed in claim 1, wherein the second spacer layer is composed of one member selected from the group consisting of fluorides, oxides, nitrides, carbides, sulfides, organic coloring agent.

12. Optical recording medium as claimed in claim 11, wherein the second spacer layer is composed of one member selected from the group consisting of $AlF_3$, $BaF_2$, $CaF_2$, $CeF_3$, $DyF_3$, $ErF_3$, $EuF_3$, $GdF_3$, $HfF_4$, $HoF_3$, $LaF_3$, $LiF$, $MgF_2$, $NaF$, $NdF_3$, $PrF_3$, $SmF_3$, $SrF_2$, $YF_3$, $YbF_3$.

13. Optical recording medium as claimed in claim 11, wherein the second spacer layer is composed of one member selected from the group consisting of $Al_2O_3$, $CeO_2$, $Cr_2O_3$, $Dy_2O_3$, $Er_2O_3$, $Eu_2O_3$, $Fe_2O_3$, $Fe_3O_4$, $Gd_2O_3$, $GeO_2$, $HfO_2$, $Ho_2O_3$, $In_2O_3$, $Lu_2O_3$, $MgO$, $MnO_2$, $MoO_3$, $Nb_2O_5$, $NiO$, $SiO$, $SiO_2$, $Sm_2O_3$, $SnO_2$, $Ta_2O_5$, $TiO_2$, $V_2O_5$, $WO_3$, $Y_2O_3$, $ZnO$, $ZrO_2$, $ZrN$, $ZrC$, $GeS$, $ZnS$.

14. Optical recording medium as claimed in claim 11, wherein the second spacer layer is composed of one member selected from the group consisting of cobalt phthalocyanine, copper phthalocyanine, molybdenum phthalocyanine, magnesium phthalocyanine, nickel phthalocyanine, zink phthalocyanine, Sudan Black B, photoresist, electron-beam resists.

15. Optical recording medium as claimed in claim 11, wherein the recording layer is composed of one member selected from the group consisting of squarylium, 5-amino-2,3-dicyano-1,4-naphthoquinone, vandyl phthalocyanine, titanyl phthalocyanine, aluminum phthalocyanine, aluminum chloride phthalocyanine, titan phthalocyanine, lead phthalocyanine, platinum phthalocyanine, Te containing plasma polymerized organic thin film, organic thin film containing Te bonded with alkyl radicals or Te bonded with fluoro carbons.

16. Optical recording medium as claimed in claim 15, wherein the recording layer is composed of one member selected from the group consisting of 5-amino-8-substituted anilino-2,3-dicyano-1,4-naphthoquinone and 5,8-substituted anilino-2,3-dicyano-1,4-naphthoquinone and the mixture thereof or the metallic complex thereof.

17. Optical recording medium as claimed in claim 1, wherein the substrate is composed of one member selected from the group consisting of synthetic resin, glass and porcelain.

18. Optical recording medium as claimed in claim 17, wherein the substrate is composed of one member selected from the group consisting of acryl resin, polycarbonate, polyetherimido, polysulfone, epoxy resin and vinyl chloride resin.

19. Optical recording medium as claimed in claim 1, wherein the substrate may be in the form of a disc, sheet or tape.

20. Optical disc memory, in which data is recorded and from which data is read by the radiation of laser beam, said optical recording disc memory comprising:

a substrate being in the form of disc and transparent to the laser beam and provided with guide grooves for guiding the axis of the laser beam;

a first spacer layer formed on the substrate, being substantially transparent to the laser beam and having a higher refractive index than the substrate with respect to said laser beam, the thickness of the first spacer layer being approximately equal to a thickness at which the first spacer layer, when combined only with the substrate, presents a maximal reflectivity with respect to a laser beam being incident on the substrate;

a second spacer layer formed on the first spacer layer, being substantially transparent to the laser beam and having a lower refractive index than the first layer with respect to said laser beam, the thickness of the second spacer layer being approximately equal to a thickness at which the second spacer layer, when combined only with said first spacer layer and the substrate, presents a minimal reflectivity with respect to a laser beam being incident on the substrate; and a recording layer formed on the second spacer layer and for storing data therein by the radiation of laser beam;

said laser beam being irradiated from said substrate to said recording layer.

21. Optical disc memory as claimed in claim 20, wherein the thickness of the first spacer layer is equal to a thickness at which the first spacer layer, when combined only with the substrate, presents a maximal reflectivity with respect to a laser beam being incident on the substrate.

22. Optical disc memory as claimed in claim 20, wherein the thickness of the first spacer layer is smaller than a thickness at which the first spacer layer, when combined only with the substrate, presents a maximal reflectivity with respect to a laser beam being incident on the substrate.

* * * * *

UNITED STATES PATENT AND TRADEMARK OFFICE
CERTIFICATE OF CORRECTION

PATENT NO.  : 4,740,447
DATED       : April 26, 1988
INVENTOR(S) : Itoh

It is certified that error appears in the above-identified patent and that said Letters Patent is hereby corrected as shown below:

COLUMN 8, LINE 47    Delete "50 nm" and insert --150 nm--;

COLUMN 10, LINE 25    Before "$Er_2O_3$" insert --$Dy_2O_3$--;

COLUMN 10, LINE 51    Delete "tha" and insert --the--;

COLUMN 11, LINE 30    Delete "preciely" and insert --precisely--;

COLUMN 18, LINE 17    Delete "obtainded" and insert --obtained--.

Signed and Sealed this

First Day of November, 1988

Attest:

DONALD J. QUIGG

*Attesting Officer*      *Commissioner of Patents and Trademarks*